(12) United States Patent
Makino et al.

(10) Patent No.: US 12,044,910 B2
(45) Date of Patent: Jul. 23, 2024

(54) OPTICAL DEVICE AND OPTICAL COMMUNICATION APPARATUS

(71) Applicant: FUJITSU OPTICAL COMPONENTS LIMITED, Kawasaki (JP)

(72) Inventors: Shuntaro Makino, Kawasaki (JP); Yoshinobu Kubota, Yokohama (JP); Yasuhiro Ohmori, Sapporo (JP); Masaharu Doi, Sapporo (JP); Masaki Sugiyama, Kawasaki (JP); Shintaro Takeuchi, Sapporo (JP); Yoshihiko Yoshida, Sapporo (JP); Shinji Maruyama, Sapporo (JP); Teruo Kurahashi, Isehara (JP)

(73) Assignee: FUJITSU OPTICAL COMPONENTS LIMITED, Kawasaki (JP)

( * ) Notice: Subject to any disclaimer, the term of this patent is extended or adjusted under 35 U.S.C. 154(b) by 50 days.

(21) Appl. No.: 17/725,944

(22) Filed: Apr. 21, 2022

(65) Prior Publication Data
US 2023/0004028 A1     Jan. 5, 2023

(30) Foreign Application Priority Data
Jul. 5, 2021   (JP) ................................. 2021-111375

(51) Int. Cl.
| | |
|---|---|
| *G02F 1/035* | (2006.01) |
| *G02F 1/21* | (2006.01) |
| *G02F 1/225* | (2006.01) |
| *H04J 14/02* | (2006.01) |

(52) U.S. Cl.
CPC ............ *G02F 1/0353* (2013.01); *G02F 1/212* (2021.01); *G02F 1/225* (2013.01); *G02F 2202/20* (2013.01); *H04J 14/02* (2013.01)

(58) Field of Classification Search
None
See application file for complete search history.

(56) References Cited

U.S. PATENT DOCUMENTS

| | | | | |
|---|---|---|---|---|
| 7,251,406 | B2 * | 7/2007 | Luo | G02B 6/1228 385/28 |
| 11,086,149 | B2 * | 8/2021 | Iwatsuka | G02F 1/225 |
| 11,181,760 | B2 * | 11/2021 | Zhang | G02F 1/035 |
| 11,262,605 | B2 * | 3/2022 | Lebby | G02B 6/12002 |
| 11,656,487 | B2 * | 5/2023 | Kataoka | G02F 1/212 385/2 |
| 2017/0052424 | A1 * | 2/2017 | Iwatsuka | G02B 6/122 |

(Continued)

FOREIGN PATENT DOCUMENTS

| | | |
|---|---|---|
| JP | 2007-264487 | 10/2007 |
| JP | 2011-102891 | 5/2011 |
| WO | WO2018/031916 | 2/2018 |

*Primary Examiner* — Rhonda S Peace
(74) *Attorney, Agent, or Firm* — STAAS & HALSEY LLP

(57) ABSTRACT

An optical device includes a thin film Lithium Niobate (LN) layer, a first optical waveguide, and a second optical waveguide. The thin film LN layer is an X-cut or a Y-cut LN layer. The first optical waveguide is an optical waveguide that is formed on the thin film LN layer along a direction that is substantially perpendicular to a Z direction of a crystal axis of the thin film LN layer. The second optical waveguide is an optical waveguide that is routed and connected to the first optical waveguide. At least a part of a core of the first optical waveguide is made thicker than a core of the second optical waveguide.

6 Claims, 19 Drawing Sheets

(56) References Cited

U.S. PATENT DOCUMENTS

| | | | |
|---|---|---|---|
| 2021/0011217 A1* | 1/2021 | Zhang | G02F 1/225 |
| 2022/0100010 A1* | 3/2022 | Kataoka | G02F 1/212 |
| 2023/0004028 A1* | 1/2023 | Makino | G02F 1/0353 |

* cited by examiner

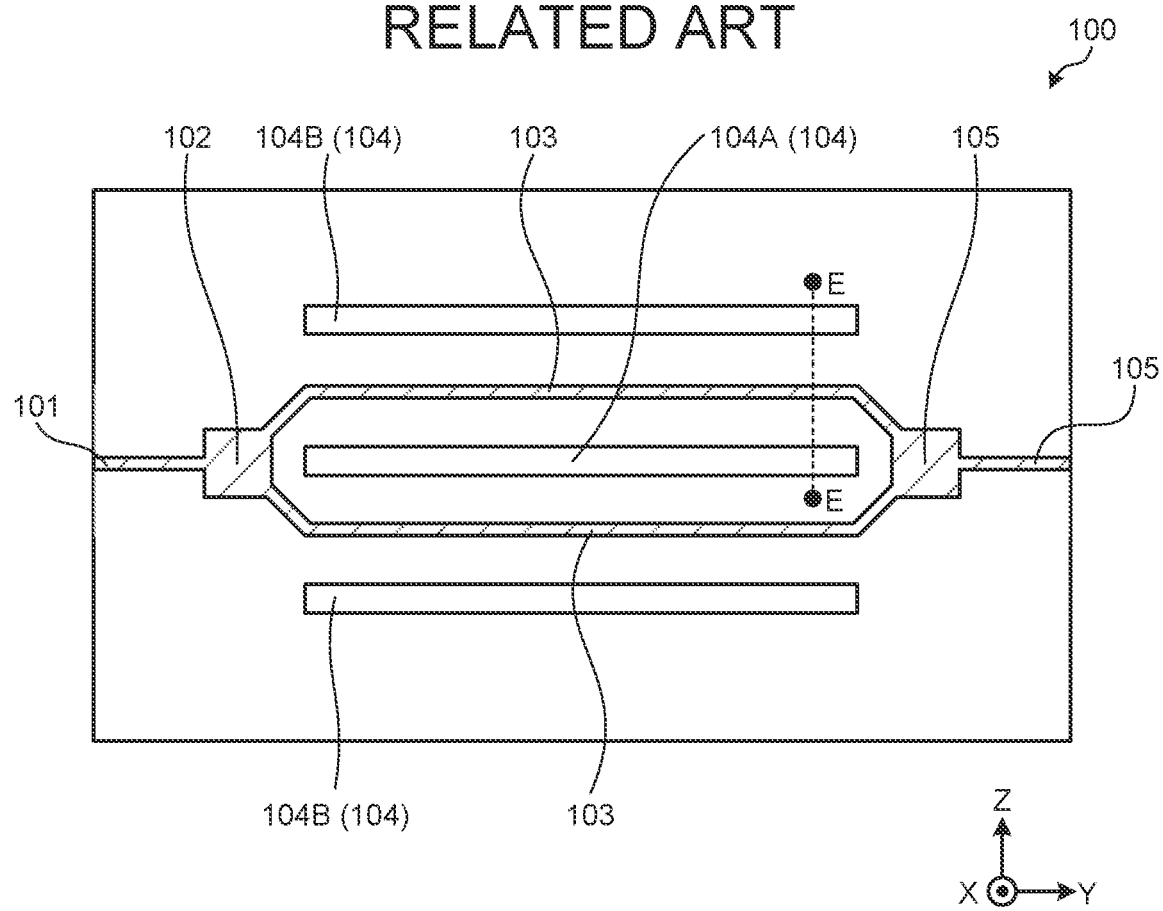

OPTICAL DEVICE AND OPTICAL COMMUNICATION APPARATUS

CROSS-REFERENCE TO RELATED APPLICATION

This application is based upon and claims the benefit of priority of the prior Japanese Patent Application No. 2021-111375, filed on Jul. 5, 2021, the entire contents of which are incorporated herein by reference.

FIELD

The embodiments discussed herein are related to an optical device and an optical communication apparatus.

BACKGROUND

For example, in an optical device, such as an optical modulator, a signal electrode is disposed on the surface of an optical waveguide, and, if a voltage is applied to the signal electrode, an electric field in a vertical direction with respect to the surface of the optical modulator is generated inside the optical waveguide. The refractive index of the optical waveguide varies due to the electric field; therefore, the phase of light propagating in the optical waveguide is changed and it is thus possible to modulate the light. In other words, the optical waveguide formed in the optical modulator constitutes, for example, a Mach-Zehnder interferometer and is able to output, for example, IQ signals that are subjected to XY polarization division multiplexing on the basis of phase differences of the light between a plurality of optical waveguides that are disposed in parallel.

FIG. 18 is a schematic plan view illustrating an example of a configuration of an optical modulator 100, and FIG. 19 is a schematic cross-sectional view illustrating an example of a cross-sectional portion taken along line E-E in FIG. 18. The optical modulator 100 illustrated in FIG. 18 includes an input unit 101, a branching unit 102, two optical waveguides 103, an electrode unit 104, a multiplexing unit 105, and an output unit 106.
Furthermore, the length direction of the optical modulator 100 is defined as the Y direction, the width direction of the optical modulator 100 is defined as the Z direction, the thickness direction of the optical modulator 100 is defined as the X direction.

The input unit 101 inputs light received from an optical fiber. The branching unit 102 branches the light received from the input unit 101. The two optical waveguides 103 are optical waveguides that are disposed in parallel and that modulate each light beam branched off at the branching unit 102. The electrode unit 104 is an electrode that applies an electrical signal to the two optical waveguides 103. The electrode unit 104 includes a pair of ground electrodes 104B and a signal electrode 104A that is disposed so as to be sandwiched by the pair of the ground electrodes 104B. The signal electrode 104A is an electrode that applies an electrical signal to the optical waveguides 103. Each of the ground electrodes 104B is an electrode that grounds the electrical signal applied to the optical waveguide 103. Each of the optical waveguide 103 is an interaction unit of a Mach-Zehnder (MZ) for modulating light by changing the phase of the light by changing an optical refractive index in accordance with the electrical signal received from the signal electrode 104A. Then, each of the optical waveguides 103 outputs the modulated light to the multiplexing unit 105. The multiplexing unit 105 multiplexes the modulated light received from each of the optical waveguides 103. The output unit 106 outputs the modulated light received from the multiplexing unit 105 to the optical fiber.

The optical modulator 100 illustrated in FIG. 19 includes a substrate 111, an intermediate layer 112 laminated on the substrate 111, a thin film LN substrate 113 that is laminated on the intermediate layer 112 and that is a LN ($LiNbO_3$) material. Moreover, the optical modulator 100 includes two optical waveguides 103 that are formed on the thin film LN substrate 113, a buffer layer 114 formed on the thin film LN substrate 113, and the electrode unit 104 formed on the buffer layer 114.

The substrate 111 is a substrate formed by using a material of, for example, Si, LN, or the like. The intermediate layer 112 is a layer made of, for example, $SiO_2$ having an optical refractive index lower than that of the LN. The thin film LN substrate 113 is a thin film substrate that strongly confines light and is advantageous in reducing its size. Furthermore, a crystal axis of the thin film LN substrate 113 corresponds to the Z direction.

The optical waveguide 103 is formed of the thin film LN substrate 113, so that the optical waveguide 103 is superior in terms of, for example, an insertion loss or transmission characteristics. The thin film LN substrate 113 is an X-cut substrate, so that it is possible to perform a chirp-free operation due to constitutional symmetry, and is suitable for long distance transmission. Each of the optical waveguides 103 is disposed between the ground electrode 104B and the signal electrode 104A. The signal electrode 104A is an electrode formed of, for example, a metal material, such as gold or copper. The ground electrode 104B is an electrode formed of, for example, a metal material, such as aluminum. The buffer layer 114 is a layer made of, for example, $SiO_2$ disposed in order to prevent light propagating through the optical waveguide 103 from being absorbed in the electrode unit 104.

The crystal direction of the thin film LN substrate 113 is the width direction (Z direction) perpendicular to the signal traveling direction (Y direction). The optical refractive index of each of the optical waveguides 103 varies in accordance with an electric field from the signal electrode 104A toward the ground electrode 104B in the electric field direction.

FIGS. 20A and 20B are explanatory diagrams illustrating an example of a TE mode and a TM mode. Two modes are present in each of the optical waveguides 103 in accordance with the direction of the main component of the electric field of the optical field. As illustrated in FIGS. 20A and 20B, there are two modes, i.e., a TE mode in which the main component of the electric field is in a planar direction and a TM mode in which the main component of the electric field in a vertical direction.
Furthermore, the arrow illustrated in FIGS. 20A and 20B indicates the direction of the main component of the electric field, and the region indicated by the dotted line illustrated in FIGS. 20A and 20B is a distribution region of light.

As illustrated in FIG. 20A, in the optical modulator 100 included in the X-cut thin film LN substrate 113, the Z direction is located in the planar direction of the optical waveguide 103, so that the signal light modulated by the electric field applied from the electrode unit 104 is in the TE mode in which the main component is the electric field in the planar direction. Accordingly, it can be said that the TM mode in which the main component of the electric field is the vertical direction is a mode that is unneeded for an operation of the optical modulator 100.

Furthermore, in the modulation efficiency of the optical modulator 100, an effect of the length of the interaction unit of each of the optical waveguides 103 for applying the electric field, that is, an effect of an optical path length is large; therefore, in order to implement a size reduction while maintaining the modulation efficiency, there is a need to construct a U-shaped structure by lengthening the interaction unit and bending the interaction unit.

FIG. 21 is a schematic plan view illustrating an example of a configuration of an optical modulator 100A having a U-shaped structure, and FIGS. 22A and 22B are schematic cross-sectional views illustrating an example of a cross-sectional portion taken along line F-F and a cross-sectional portion taken along line G-G in FIG. 21.

Furthermore, by assigning the same reference numerals to components having the same configuration as those in the optical modulator 100 illustrated in FIG. 18 and FIG. 19, overlapped descriptions of the configuration and the operation thereof will be omitted. The optical waveguide included in the optical modulator 100A illustrated in FIG. 21 includes an optical waveguide 103A (103) disposed on the outbound side, an optical waveguide 108 having a U-shaped structure, and an optical waveguide 103B (103) disposed on the inbound side.

The optical waveguide 103A disposed on the outbound side and the optical waveguide 103B disposed on the inbound side are optical waveguides that are formed on the thin film LN substrate 113 along the Y direction in which the propagation direction (propagation angle) is zero degrees. The cross-sectional portion taken along line F-F illustrated in FIG. 22A corresponds to the optical waveguide 103A disposed on the outbound side. The thickness of the core of the optical waveguide 103A disposed on the outbound side is defined as Ha10. Furthermore, the thickness of the core of the optical waveguide 103A disposed on the outbound side is the same as that of the optical waveguide 103B disposed on the inbound side.

The optical waveguide 108 having the U-shaped structure is an optical waveguide that is formed on the thin film LN substrate 113 along the Z direction in which the propagation direction (propagation angle) is other than zero degrees, for example, is 90 degrees. The cross-sectional portion taken along line G-G illustrated in FIG. 22B corresponds to the optical waveguide 108 having the U-shaped structure. The thickness of the core of the U-shaped optical waveguide 108 is defined as Hb10. Furthermore, the thickness Ha10 of each of the core of the optical waveguide 103A disposed on the outbound side and the optical waveguide 103B disposed on the inbound side are defined to be the same as the thickness Hb10 of the core of the U-shaped optical waveguide 108.

FIG. 23A is an explanatory diagram illustrating an example of a dependence property of a propagation angle with respect to an effective refractive index in the case where the thickness of the core of the optical waveguide 103 is defined as 1 μm. If it is assumed that the thickness of the core of the optical waveguide 103 is defined as 1 μm, in the X-cut thin film LN substrate 113, the refractive index in the planar direction varies in accordance with a change in the propagation direction of the optical waveguide 103, so that the effective refractive index in the TE mode also varies. Furthermore, the refractive index in the vertical direction is constant regardless of the propagation direction of the optical waveguide 103, so that the effective refractive index in the TM mode remains unchanged even when the propagation direction of the optical waveguide 103 varies.

Patent Document 1: Japanese Laid-open Patent Publication No. 2007-264487
Patent Document 2: Japanese Laid-open Patent Publication No. 2011-102891
Patent Document 3: International Publication Pamphlet No. WO 2018/031916

In the optical modulator 100A, if the Y direction is defined as zero degrees and the Z direction is defined as 90 degrees as the propagation angle of the optical waveguide 103, as illustrated in FIG. 23A, the effective refractive index in the TE mode increases as the propagation angle of the optical waveguide 103 is closer to 90 degrees. Accordingly, in the optical modulator 100A, if the core of the optical waveguide 103 is made thicker, a propagation angle in which the effective refractive index in the TE mode agrees with the effective refractive index in the TM mode occurs. As a result, the signal light in the TE mode is converted to unneeded light in the TM mode, and thus, the TM mode that is unneeded for the TE mode becomes crosstalk.

Therefore, if the thickness of the core of the optical waveguide 103 is made thinner, it is possible to prevent the crosstalk with respect to the TM mode. FIG. 23B is an explanatory diagram illustrating an example of a dependence property of a propagation angle with respect to an effective refractive index in the case where the thickness of the core of the optical waveguide 103 is defined as 0.4 μm. If the thickness of the core of the optical waveguide 103 is defined as, for example, 0.4 μm, the propagation angle in which the effective refractive index in the TE mode agrees with the effective refractive index in the TM mode does not occur, so that it is possible to prevent the crosstalk with respect to the TE mode.

However, in the optical modulator 100A, if the thickness of the core of the optical waveguide 103 is made thinner in terms of preventing the crosstalk, confinement of light to the thin film LN substrate 113 becomes weak. FIG. 24 is an explanatory diagram illustrating an example of a change in modulation efficiency in accordance with the thickness of the core of the optical waveguide 103. In the optical modulator 100A, if the thickness of the core of the optical waveguide 103 is made thinner, confinement of the light to the thin film LN substrate 113 is reduced, so that the modulation efficiency is degraded. FIG. 25 is an explanatory diagram illustrating an example of a change in coupling efficiency in accordance with the thickness of the core of the optical waveguide 103. In the optical modulator 100A, if the thickness of the core of the optical waveguide 103 is made thinner, confinement of the light to the thin film LN substrate 113 is reduced, so that the coupling efficiency with an optical fiber is accordingly degraded caused by a reduction in an optical mode field by reducing the thickness of the core. Therefore, in the optical modulator 100A, a relationship between prevention of crosstalk with respect to the TE mode and improvement of the modulation efficiency and the coupling efficiency is a trade-off relationship.

SUMMARY

According to an aspect of an embodiment, an optical device includes an X-cut or a Y-cut thin film Lithium Niobate (LN) layer; a first optical waveguide that is formed on the thin film LN layer along a direction that is substantially perpendicular to a Z direction of a crystal axis of the thin film LN layer; and a second optical waveguide that is routed and connected to the first optical waveguide. At least a part of a core of the first optical waveguide is made thicker than a core of the second optical waveguide.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 18 is a schematic plan view illustrating an example of a configuration of an optical modulator;

DESCRIPTION OF EMBODIMENTS

Preferred embodiments of the present invention will be explained with reference to accompanying drawings. Furthermore, the present invention is not limited to the embodiments.

[a] First Embodiment

Figure 1:
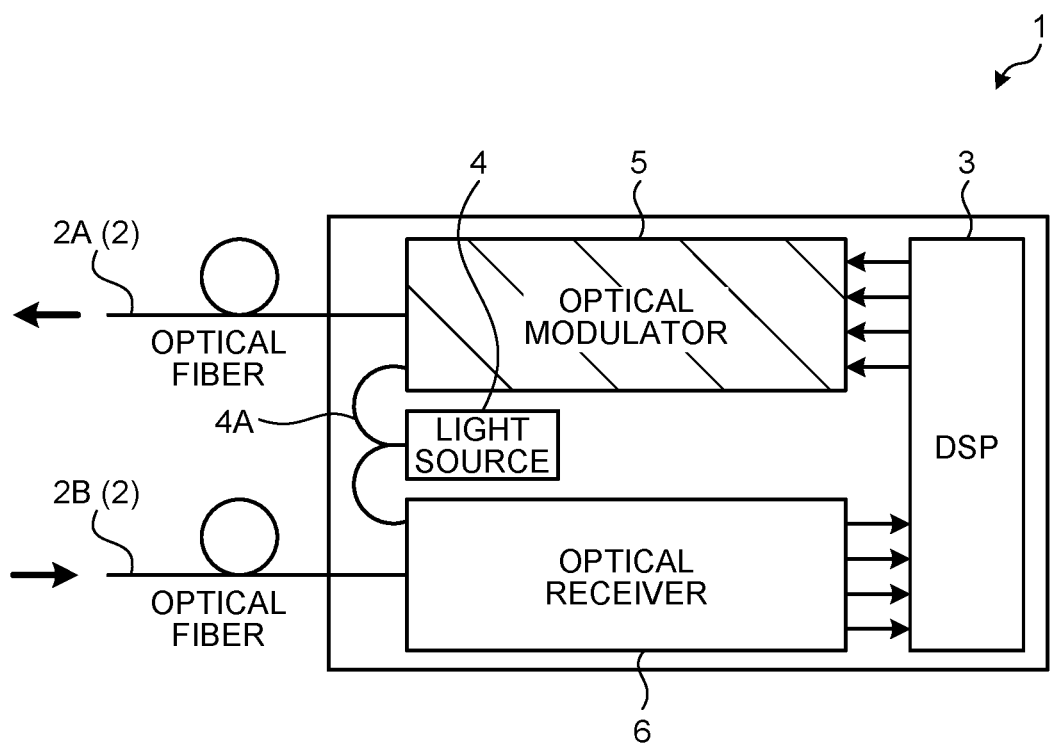
FIG. 1 is a block diagram illustrating an example of a configuration of an optical communication apparatus according to a first embodiment.

FIG. 1 is a block diagram illustrating an example of a configuration of an optical communication apparatus 1 according to a first embodiment. The optical communication apparatus 1 illustrated in FIG. 1 is connected to an optical fiber 2A (2) that is disposed on the output side and an optical fiber 2B (2) that is disposed on the input side. The optical communication apparatus 1 includes a digital signal processor (DSP) 3, a light source 4, an optical modulator 5, and an optical receiver 6. The DSP 3 is an electrical component that performs digital signal processing. The DSP 3 performs a process of, for example, encoding transmission data or the like, generates an electrical signal including the transmission data, and outputs the generated electrical signal to the optical modulator 5. Furthermore, the DSP 3 acquires an electrical signal including reception data from the optical receiver 6 and obtains reception data by performing a process of decoding the acquired electrical signal.

The light source 4 is, for example, a laser diode or the like, generates light with a predetermined wavelength, and supplies the generated light to the optical modulator 5 and the optical receiver 6 by way of an optical fiber 4A. The optical modulator 5 is an optical device that modulates, by using the electrical signal output from the DSP 3, the light supplied from the light source 4 and that outputs the obtained optical transmission signal to the optical fiber 2A. The optical modulator 5 is an optical device, such as a LN optical modulator, that includes an optical waveguide of, for example, lithium niobate (LN) and a signal electrode that has a coplanar (coplanar waveguide: CPW) structure.

The optical receiver 6 receives the optical signal from the optical fiber 2B, and demodulates the received optical signal by using the light supplied from the light source 4. Then, the optical receiver 6 converts the demodulated received optical signal to an electrical signal and outputs the converted electrical signal to the DSP 3.

Figure 2:
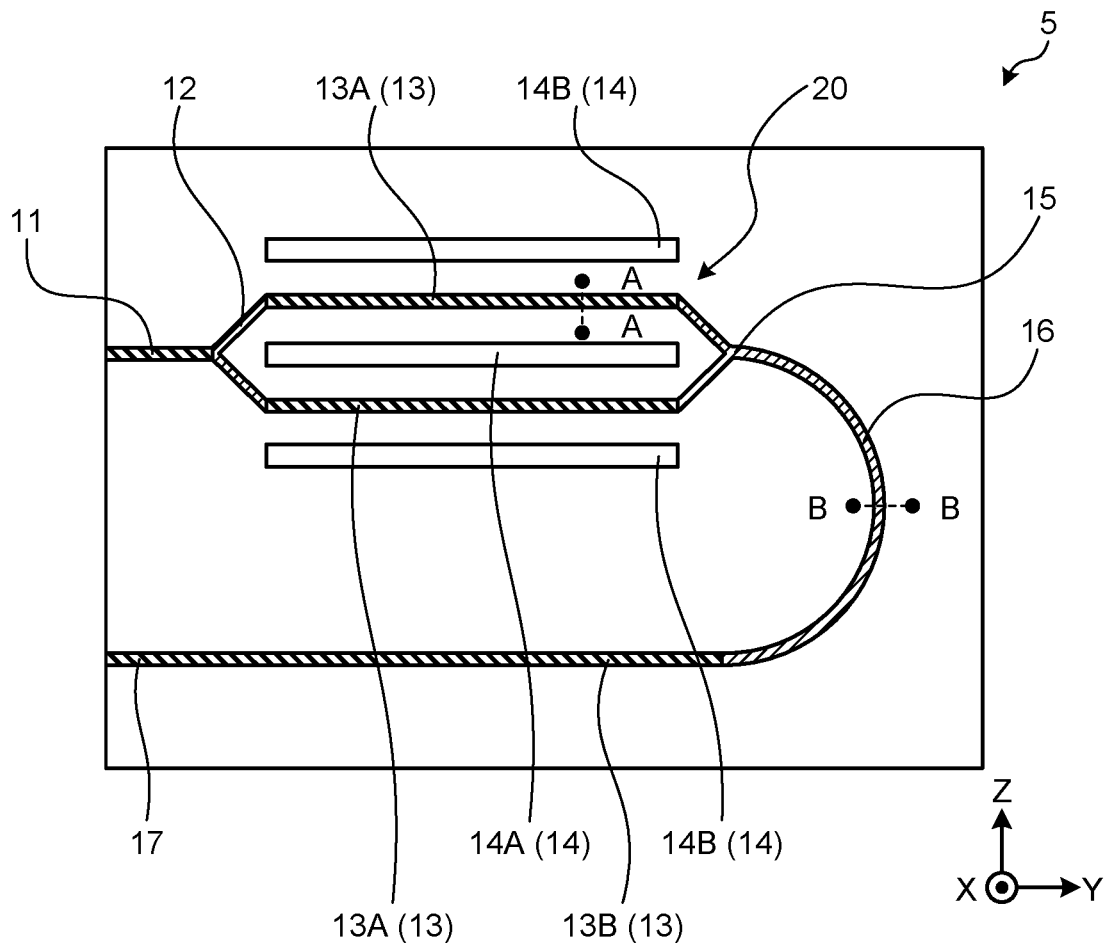
FIG. 2 is a schematic plan view illustrating an example of a configuration of an optical modulator according to the first embodiment.

FIG. 2 is a schematic plan view illustrating an example of a configuration of the optical modulator 5 according to the first embodiment. The optical modulator 5 illustrated in FIG. 2 includes an input unit 11, a branching unit 12, two pieces of first optical waveguides 13A (13) that are disposed on the outbound side, an electrode unit 14, a multiplexing unit 15, a second optical waveguide 16, a first optical waveguide 13B (13) disposed on the inbound side, and an output unit 17. Furthermore, the length direction (the propagation direction) of the optical modulator 5 is defined as the Y direction, the width direction (the planar direction) of the optical modulator 5 is defined as the Z direction, and the thickness direction of the optical modulator 5 is defined as the X direction.

The input unit 11 inputs the light emitted from the optical fiber 4A. Furthermore, the light emitted from the optical fiber 4A is the light emitted from the light source 4. The branching unit 12 branches the light received from the input unit 11. The two first optical waveguides 13A disposed on the outbound side are optical waveguides that function as interaction units of Mach-Zehnder (MZ), that are disposed in parallel, and that modulate each of the light beams branched off at the branching unit 12. The two first optical waveguides 13A disposed on the outbound side are ridge-type waveguides each having, for example, a core and a slab that has a thickness thinner than the thickness of the core and that is disposed on both sides of the core. The two first optical waveguides 13A disposed on the outbound side are optical waveguides that are formed on a thin film LN layer 33 along the direction that is substantially perpendicular to the Z direction of the crystal axis of the thin film LN layer 33, which will be described later, for example, along the Y direction.

The electrode unit 14 is an electrode that applies an electrical signal to the two first optical waveguides 13A disposed on the outbound side. The two first optical waveguides 13A disposed on the outbound side modulate light caused by a change in the optical refractive index in accordance with the electrical signal received from the electrode unit 14, and then, outputs each of the pieces of modulated light to the multiplexing unit 15. The electrode unit 14 includes a signal electrode 14A and a pair of ground electrodes 14B. The signal electrode 14A is an electrode that applies an electrical signal to the first optical waveguide 13A disposed on the outbound side. The ground electrodes 14B are electrodes each of which grounds the electrical signal applied to the first optical waveguide 13A disposed on the outbound side. The two first optical waveguides 13A disposed on the outbound side modulate light by changing the phase of the light by changing the optical refractive index in accordance with the electrical signal received from the signal electrode 14A, and then, output the modulated light to the multiplexing unit 15. The multiplexing unit 15 multiplexes the modulated light that has been modulated by each of the two first optical waveguides 13A disposed on the outbound side. The optical modulator 5 constitutes a modulating unit 20 by using the two first optical waveguides 13A disposed on the outbound side and the electrode unit 14.

The second optical waveguide 16 is a U-shaped optical waveguide through which the modulated light output from the multiplexing unit 15 passes. The second optical waveguide 16 is an optical waveguide that includes at least one of a straight line waveguide that is formed on the thin film LN layer 33 along the direction other than the direction that is substantially perpendicular to the Z direction and bent waveguide in which the propagation direction is smoothly changed.

The first optical waveguide 13B that is disposed on the inbound side is an optical waveguide through which the modulated light output from the second optical waveguide 16 passes. The first optical waveguide 13B disposed on the inbound side is an optical waveguide that is formed on the thin film LN layer 33 along the direction that is substantially perpendicular to the Z direction of the crystal axis of the thin film LN layer 33. The output unit 17 is connected to the optical fiber 2A, and outputs the modulated light received from the first optical waveguide 13B that is disposed on the inbound side to the optical fiber 2A.

Figure 3A:
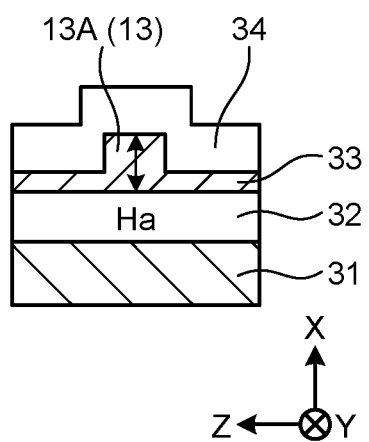
FIGS. 3A and 3B are schematic cross-sectional views illustrating an example of a cross-sectional portion taken along line A-A and a cross-sectional portion taken along line B-B in FIG. 2.
Figure 3B:
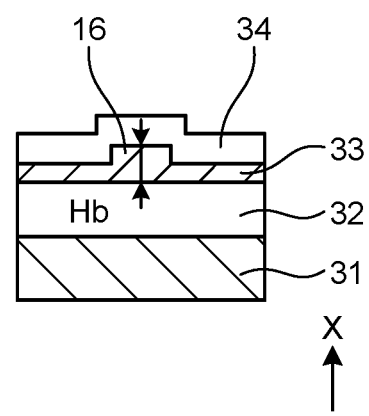

FIGS. 3A and 3B are schematic cross-sectional views illustrating an example of a cross-sectional portion taken along line A-A and a cross-sectional portion taken along line B-B in FIG. 2. The optical modulator 5 illustrated in FIGS. 3A and 3B includes a substrate 31, an intermediate layer 32 laminated on the substrate 31, the thin film LN layer 33 laminated on the intermediate layer 32, and two first optical waveguides 13 formed on the thin film LN layer 33. Moreover, the optical modulator 5 includes a buffer layer 34 laminated on the thin film LN layer 33 and the electrode unit 14 formed on the buffer layer 34.

The substrate 31 is a substrate made of, for example, a Si or LN material, such as $SiO_2$ (silicon dioxide) or $TiO_2$ (titanium dioxide). The intermediate layer 32 is a layer made of, for example, $SiO_2$ or $TiO_2$ having the optical refractive index lower than that of the LN. The thin film LN layer 33 is formed of a substrate using a LN-crystal thin film and on which the first optical waveguide 13 that has a convex shape and that protrudes upward at a predetermined portion is formed. By using the LN material, the thin film LN layer 33 strongly confines light and is advantageous in reducing its size.

The thin film LN layer 33 is an X-cut substrate. The thin film LN layer 33 is a substrate made of a LN ($LiNbO_3$) material. The two first optical waveguides 13A disposed on the outbound side are formed of the thin film LN layer 33 and the material of the thin film LN layer 33 is LN, so that, the first optical waveguides 13A are superior in terms of, for example, an insertion loss or transmission characteristics. The optical modulator 5 is able to perform a chirp-free operation due to constitutional symmetry, and is suitable for long distance transmission.

The buffer layer 34 is a layer that is made of, for example, $SiO_2$ and that is provided to prevent the light propagating through the first optical waveguide 13 from being absorbed in the electrode unit 14.

The thin film LN layer 33 with a thickness of 0.5 to 3 μm is sandwiched between the intermediate layer 32 and the buffer layer 34. The width of protrusion corresponding to the first optical waveguide 13 having a convex shape formed on the thin film LN layer 33 is about, for example, 1 to 8 μm. The thin film LN layer 33 and the first optical waveguide 13 are covered by the buffer layer 34.

The signal electrode 14A is an electrode that is made of, for example, a metal material, such as gold or copper, that has a width of 2 to 10 μm, and that has a thickness of 1 to 20 μm. The ground electrode 14B is an electrode that is made of, for example, a metal material, such as aluminum, and that has a thickness greater than or equal to 1 μm. As a result of a drive voltage in accordance with the electrical signal that is output from the DSP 3 being transmitted by the signal electrode 14A, an electric field in a direction from the signal electrode 14A toward the ground electrode 14B is generated and the generated electric field is applied to the first optical waveguide 13. As a result, the refractive index of the first optical waveguide 13 is changed in accordance with the electric field applied to the first optical waveguide 13, and it is thus possible to modulate the light propagating through the first optical waveguide 13.

If the Z direction of the crystal axis of the thin film LN layer 33 is defined as 90 degrees and if the Y direction thereof is defined as zero degrees, the two first optical waveguides 13A disposed on the outbound side are optical waveguides that are formed in a straight line along the Y direction having almost zero degrees included in the optical waveguide formed in a chip of the optical modulator 5. As illustrated in FIG. 3A, the thickness of the core of each of the two first optical waveguides 13A disposed on the outbound side is defined as Ha. Furthermore, in addition to zero degrees, it is assumed that almost zero degrees includes a margin of a manufacturing error of the first optical waveguide 13 at the time at which the optical waveguide is manufactured by aiming at, for example, zero degrees, that is, for example, within ±20 degrees. Because the two first optical waveguides 13A disposed on the outbound side are formed on the thin film LN layer 33 along the direction that is substantially perpendicular to the Z direction of the crystal axis of the thin film LN layer 33, the thickness of each of the two first optical waveguides 13A is made thicker than the thickness Hb of the core of the second optical waveguide 16, so that it is possible to improve the modulation efficiency and the coupling efficiency. Similarly to the core of each of the two first optical waveguides 13A disposed on the outbound side, as illustrated in FIG. 3A, the thickness, in the X direction, of the core of each of the first optical waveguide 13B disposed on the inbound side, the input unit 11, and the output unit 17 is also defined as Ha.

It is assumed that the core of the second optical waveguide 16 is an optical waveguide that is formed on the thin film LN layer 33 along the direction that does not perpendicular to the Z direction, that is, along the direction other than the Y direction that is zero degrees, and is defined that, as illustrated in FIG. 3B, the thickness of the core thereof is Hb.

Furthermore, the direction that does not perpendicular to the Z direction mentioned here is in the range that is greater than the angle that is actually deviated from, for example, the Y direction, and in the range that is less than or equal to 90 degrees in the Z direction. As a result of the second optical waveguide 16 being formed on the thin film LN layer 33 along the direction other than the direction that is substantially perpendicular to the Z direction, the thickness of the second optical waveguide 16 is made thinner than the thickness Ha of the first optical waveguide 13, so that it is possible to prevent crosstalk in the unneeded TM mode with respect to the TE mode. Furthermore, it is assumed that the core of each of the branching unit 12 and the multiplexing unit 15 is also the thickness Hb that is the same thickness as that of the core of the second optical waveguide 16. Furthermore, it is assumed that the second optical waveguide 16, the branching unit 12, and the multiplexing unit 15 are the second optical waveguide that are routed and connected to the first optical waveguide 13.

Figure 4:
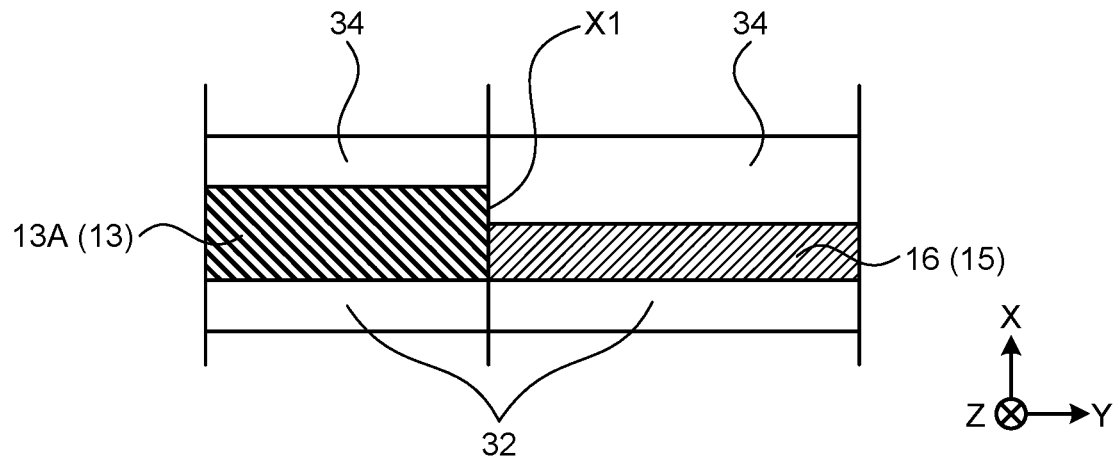
FIG. 4 is an explanatory diagram illustrating an example of a joining portion.

FIG. 4 is a diagram illustrating an example of a joining portion. The joining portion joins the core of the first optical waveguide 13 and the core of the multiplexing unit 15 that have a different height between the core of the first optical waveguide 13 and the core of the multiplexing unit 15. Furthermore, the thickness of the core of the multiplexing unit 15 is the same as the thickness of the core of the second optical waveguide 16. In other words, the core of each of the two first optical waveguides 13A disposed on the outbound side, the first optical waveguide 13B disposed on the inbound side, the input unit 11, and the output unit 17 is made thicker than the core of the second optical waveguide 16.

The optical modulator 5 according to the first embodiment includes the X-cut thin film LN layer 33, the first optical waveguide 13 that is formed on the thin film LN layer 33 along the direction that is substantially perpendicular to the Z direction of the crystal axis of the thin film LN layer 33, and the second optical waveguide 16 that is routed and connected to the first optical waveguide 13. At least a part of the core of the first optical waveguide 13 is made thicker than the core of the second optical waveguide 16. As a result of the first optical waveguide 13 being formed along the direction substantially perpendicular to the Z direction of the crystal axis, that is, along, for example, the Y direction, the core of the first optical waveguide 13 is thicker than the core of the second optical waveguide 16, so that the modulation efficiency and the coupling efficiency are improved. Moreover, the core of the second optical waveguide 16 is made thinner than the core of the first optical waveguide 13, so that it is possible to prevent crosstalk in the unneeded TM mode with respect to the TE mode. In other words, it is possible to improve the modulation efficiency and the coupling efficiency while preventing crosstalk.

The second optical waveguide 16 includes at least one of the straight line waveguide and the bent waveguide formed on the thin film LN layer 33 along the direction other than the direction that is substantially perpendicular to the Z direction. As a result, the core of the thickness of the second optical waveguide 16 is made thinner than the core of the first optical waveguide 13, so that it is possible to prevent crosstalk in the unneeded TM mode with respect to the TE mode.

In addition, for convenience of description, the X-cut thin film LN layer 33 has been used as an example; however, the optical modulator 5 using a Y-cut thin film LN layer may be applied. The optical modulator 5 includes the Y-cut thin film LN layer 33, the first optical waveguide 13 that is formed on the thin film LN layer 33 along the direction that is substantially perpendicular to the Z direction of the crystal axis of the thin film LN layer, and the second optical waveguide 16 that is routed and connected to the first optical waveguide 13. Then, the optical modulator 5 is configured to have a structure such that at least a part of the core of the first optical waveguide 13 is made thicker than the core of the second optical waveguide 16. Consequently, as a result of the first optical waveguide 13 being formed along the direction substantially perpendicular to the Z direction of the crystal axis, that is, along, for example, the Y direction, the core of the first optical waveguide 13 is made thicker than the core of the second optical waveguide 16, so that the modulation efficiency and the coupling efficiency are improved. Moreover, the core of the second optical waveguide 16 is made thinner than the core of the first optical waveguide 13, so that it is possible to prevent crosstalk in the unneeded TM mode with respect to the TE mode. In other words, it is possible to improve the modulation efficiency and the coupling efficiency while preventing crosstalk.

The joining portion in which the first optical waveguide 13 and the second optical waveguide 16 are joined may include an optical waveguide, in which a part of the core is formed to have the thickness Hb, that is formed along almost zero degrees direction.

The thickness of the core inside the first optical waveguide 13 need not be Ha along the entire length of the first optical waveguide 13; instead, the thickness of a part of the core may be Ha, and appropriate modifications are possible. Also, the thickness of the core inside the second optical waveguide 16 need not be Hb along the entire length of the second optical waveguide 16; instead, the thickness of a part of the core may be Hb.

The second optical waveguide 16, the branching unit 12, and the multiplexing unit 15 are used an example of the optical waveguide that is routed and connected to the first optical waveguide 13; however, the example is not limited to this, and appropriate modifications are possible.

Furthermore, a case has been described as one example in which the first optical waveguide 13 and the second optical waveguide 16 according to the first embodiment are constituted of the ridge-type waveguide; however, the example is not limited to this, and an embodiment thereof will be described below as a second embodiment.

[b] Second Embodiment

Figure 5:
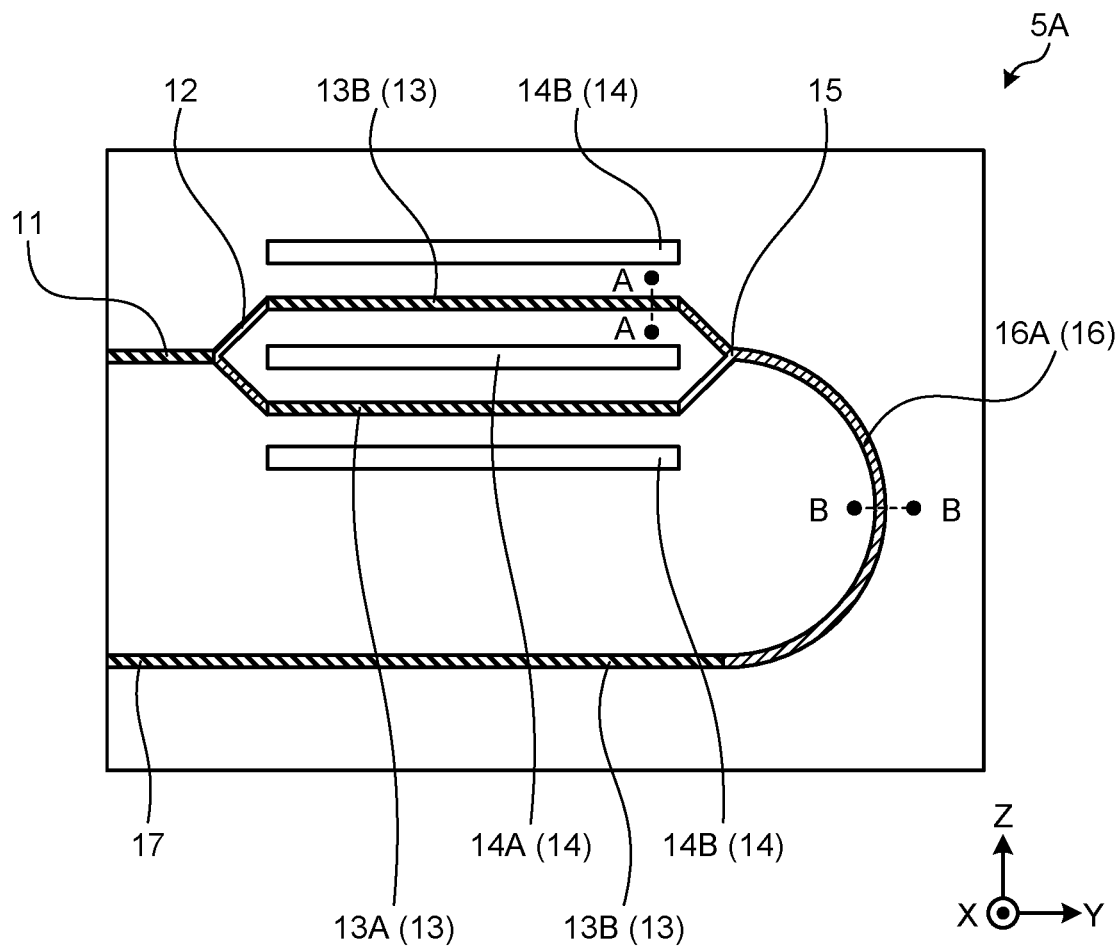
FIG. 5 is a schematic plan view illustrating an example of a configuration of an optical modulator according to a second embodiment.
Figure 6A:
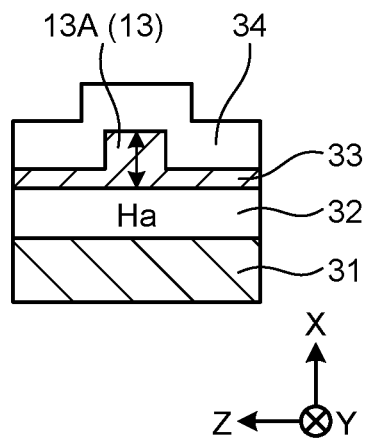
FIGS. 6A and 6B are schematic cross-sectional views illustrating an example of a cross-sectional portion taken along line A-A and a cross-sectional portion taken along line B-B in FIG. 5.
Figure 6B:
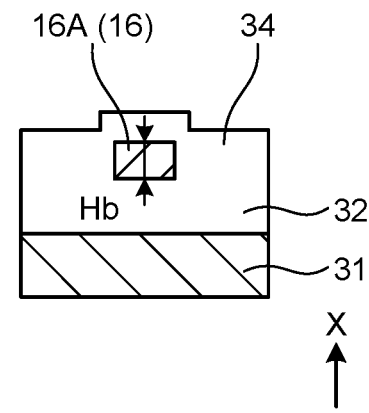

FIG. 5 is a schematic plan view illustrating an example of a configuration of an optical modulator 5A according to the second embodiment. Furthermore, by assigning the same reference numerals to components having the same configuration as those in the optical modulator 5 according to the first embodiment, overlapped descriptions of the configuration and the operation thereof will be omitted. FIGS. 6A and 6B are schematic cross-sectional views illustrating an example of a cross-sectional portion taken along line A-A and a cross-sectional portion taken along line B-B in FIG. 5. The cross-sectional portion taken along line A-A of the optical modulator 5A corresponds to a portion of the first optical waveguide 13A disposed on the outbound side. The first optical waveguide 13A on the outbound side is a ridge-type waveguide. The cross-sectional portion taken along line B-B corresponds to a portion of the second optical waveguide 16. A second optical waveguide 16A (16) is a channel waveguide. The channel waveguide is formed such that the core of the optical waveguide has a rectangular shape in cross section as illustrated in FIG. 6B.

The core of each of the two first optical waveguides 13A disposed on the outbound side, the input unit 11, the first optical waveguide 13B disposed on the inbound side, and the output unit 17 is the ridge-type waveguides, and thickness of the core is defined as Ha. The core of each of the second optical waveguide 16A, the branching unit 12, and the multiplexing unit 15 is the channel waveguides, and the thickness of the core is defined as Hb. In other words, the core of each of the two first optical waveguides 13A disposed on the outbound side, the first optical waveguide 13B disposed on the inbound side, the input unit 11, and the output unit 17 is made thicker than the core of the second optical waveguide 16A.

The optical modulator 5A according to the second embodiment is configured such that the first optical waveguide 13A disposed on the outbound side and the first optical waveguide 13B disposed on the inbound side are the ridge-type waveguide, whereas the second optical waveguide 16A is the channel waveguide. Moreover, in the optical modulator 5A, the core of each of the first optical waveguide 13A disposed on the outbound side and the first optical waveguide 13B on the inbound side is made thicker than the thickness of the core of the second optical waveguide 16A. Consequently, as a result of the first optical waveguide 13 being formed along the direction substantially perpendicular to the Z direction of the crystal axis, that is, along, for example, the Y direction, the core of the first optical waveguide 13 is made thicker than the core of the second optical waveguide 16A, so that the modulation efficiency and the coupling efficiency are improved. Moreover, the second optical waveguide 16A is made thinner than the core of the first optical waveguide 13, so that it is possible to prevent crosstalk in the unneeded TM mode with respect to the TE mode. In other words, it is possible to improve the modulation efficiency and the coupling efficiency while preventing crosstalk.

In addition, for convenience of description, a case has been described as one example in which the first optical waveguide 13 is the ridge-type waveguide, whereas the second optical waveguide 16A is the channel waveguide; however, the first optical waveguide 13 may be the channel waveguide, whereas the second optical waveguide 16A may be the ridge-type waveguide, and appropriate modifications are possible.

Figure 7A:
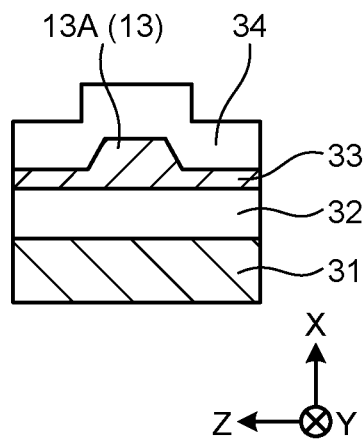
FIGS. 7A and 7B are schematic cross-sectional views illustrating a modification of a cross-sectional portion taken along line A-A and a cross-sectional portion taken along line B-B in FIG. 5.
Figure 7B:
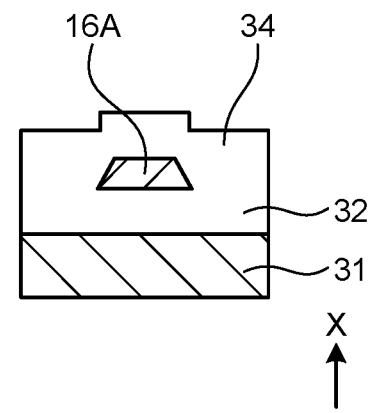

FIGS. 7A and 7B are schematic cross-sectional views illustrating a modification of a cross-sectional portion taken along line A-A and a cross-sectional portion taken along line B-B in FIG. 5. The cross-sectional portion taken along line A-A of the first optical waveguide 13 is the ridge-type waveguide and may be formed such that the cross-section of the core has a side wall surface having a predetermined inclination angle instead of a rectangular shape, as illustrated in FIG. 7A. The inclination angle of the side wall surface of the core is about, for example, 80 degrees.

The cross-sectional portion taken along line B-B of the second optical waveguide 16A is the channel waveguide and may be formed such that the cross-section of the core has a side wall surface having a predetermined inclination angle instead of a rectangular shape, as illustrated in FIG. 7B. The inclination angle of the side wall surface of the core is about, for example, 80 degrees.

In addition, in the second embodiment, a case has been described as one example in which the core of the second optical waveguide 16A is constituted of the channel waveguide, the core of the second optical waveguide 16A may be constituted of a channel waveguide and a ridge-type waveguide in a mixed manner, and appropriate modifications are possible. The core of the first optical waveguide 13 may be constituted of a channel waveguide and a ridge-type waveguide in a mixed manner.

In the joining portion in which the core of the first optical waveguide 13 and the core of the second optical waveguide 16 (the multiplexing unit 15) are joined used in the first embodiment, the thickness of the core of the first optical waveguide 13 is different from the thickness of the core of the second optical waveguide 16 (the multiplexing unit 15), so that, as illustrated in FIG. 4, a step X1 is generated. In the joining portion, the step X1 is generated between the core of the first optical waveguide 13 and the core of the second optical waveguide 16 (the multiplexing unit 15), so that the coupling efficiency is degraded. Accordingly, in order to cope with the circumstances, an embodiment thereof will be described below as a third embodiment.

[c] Third Embodiment

Figure 8:
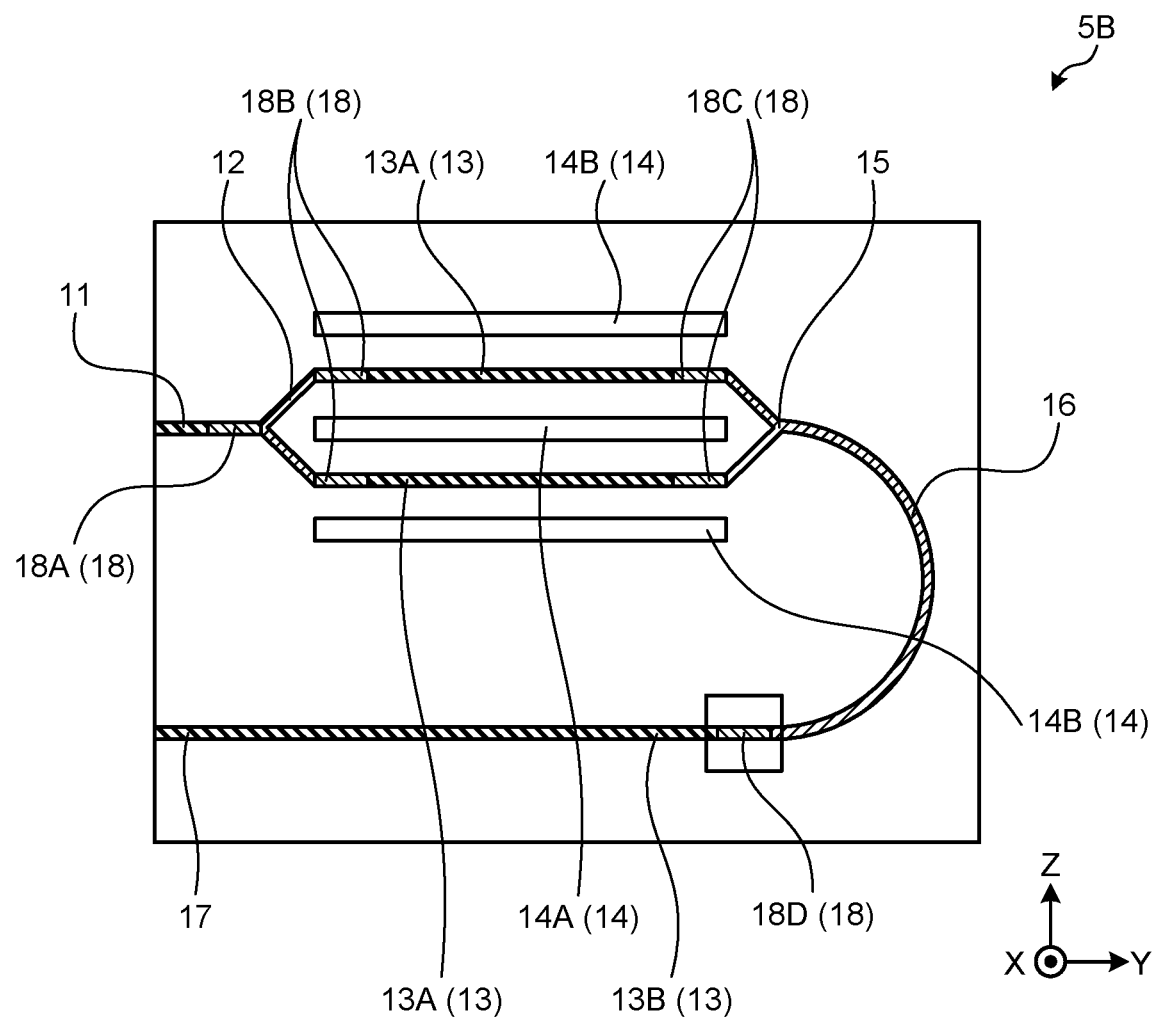
FIG. 8 is a schematic plan view illustrating an example of a configuration of an optical modulator according to a third embodiment.

FIG. 8 is a schematic plan view illustrating an example of a configuration of an optical modulator 5B according to the third embodiment. Furthermore, by assigning the same reference numerals to components having the same configuration as those in the optical modulator 5 according to the first embodiment, overlapped descriptions of the configuration and the operation thereof will be omitted. The optical modulator 5B illustrated in FIG. 8 is different from the optical modulator 5 illustrated in FIG. 2 in that the optical modulator 5B includes a joining unit 18D (18) in which, for example, the first optical waveguide 13B disposed on the inbound side and the second optical waveguide 16 are joined.

The optical modulator 5B includes a joining unit 18A that joins the input unit 11 and the branching unit 12, a joining unit 18B that joins the branching unit 12 and one of the first optical waveguides 13A disposed on the outbound side, the other joining unit 18B that joins the branching unit 12 and the other of the first optical waveguides 13A disposed on the outbound side. Moreover, the optical modulator 5B includes a joining unit 18C that joins one of the first optical waveguides 13A disposed on the outbound side and the multiplexing unit 15, and the other joining unit 18C that joins the other of the first optical waveguides 13A disposed on the outbound side and the multiplexing unit 15. Moreover, the optical modulator 5B includes the joining unit 18D that joins the second optical waveguide 16 and the first optical waveguide 13B disposed on the inbound side.

Figure 9A:
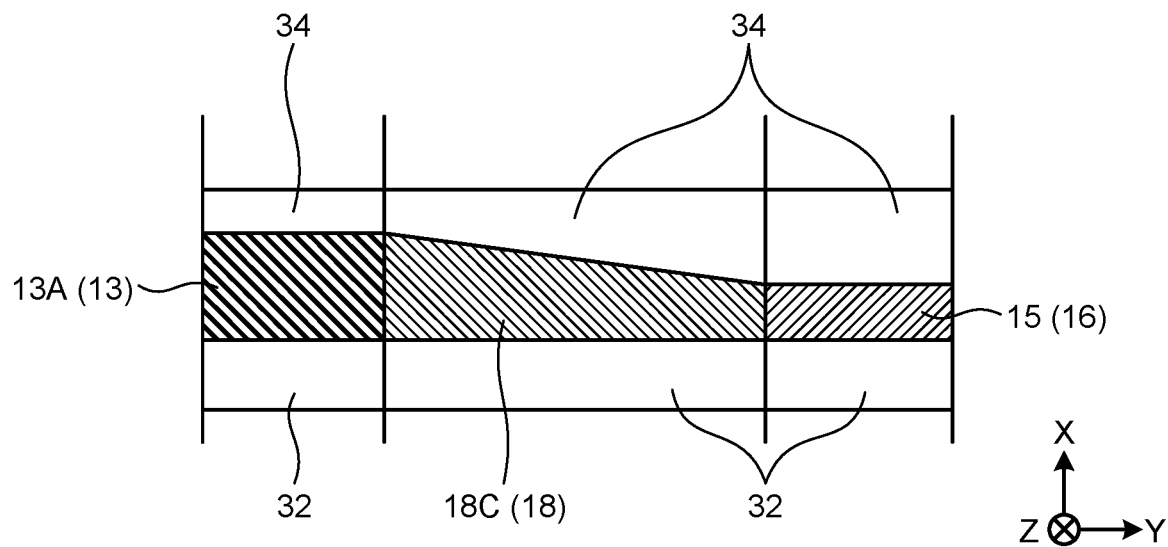
FIG. 9A is an explanatory diagram illustrating an example of a joining unit.

FIG. 9A is an explanatory diagram illustrating an example of the joining unit 18. The core of the joining unit 18C (18) that joins the first optical waveguide 13A disposed on the outbound side and the multiplexing unit 15 has a tapered structure that is gradually thinner from the core of the first optical waveguide 13A disposed on the outbound side toward the core of the multiplexing unit 15. The core of the joining unit 18A that joins the input unit 11 and the branching unit 12 has a tapered structure that is gradually thinner from the core of the input unit 11 toward the core of the branching unit 12. The core of the joining unit 18B that joins the branching unit 12 and the first optical waveguide 13A disposed on the outbound side has a tapered structure that is gradually thinner from the core of the branching unit 12 toward the core of the first optical waveguide 13A disposed on the outbound side.

The core of the joining unit 18D that joins the second optical waveguide 16 and the first optical waveguide 13B disposed on the inbound side has a tapered structure that is gradually thicker from the core of the second optical waveguide 16 toward the core of the first optical waveguide 13B disposed on the inbound side.

The optical modulator 5 according to the third embodiment is formed such that the core of the joining unit 18 that joins the first optical waveguide 13 and the second optical waveguide 16 has a tapered structure that is gradually thinner from the core of the first optical waveguide 13 toward the core of the second optical waveguide 16. As a result, by minimizing the size of the step X1 inside the core of the joining unit 18, it is possible to improve the coupling efficiency.

The joining unit 18 having the tapered shape in which the height of the core is gradually changed may be formed along substantially 90 degree direction relative to the Z direction, and appropriate modifications are possible.

Figure 9B:
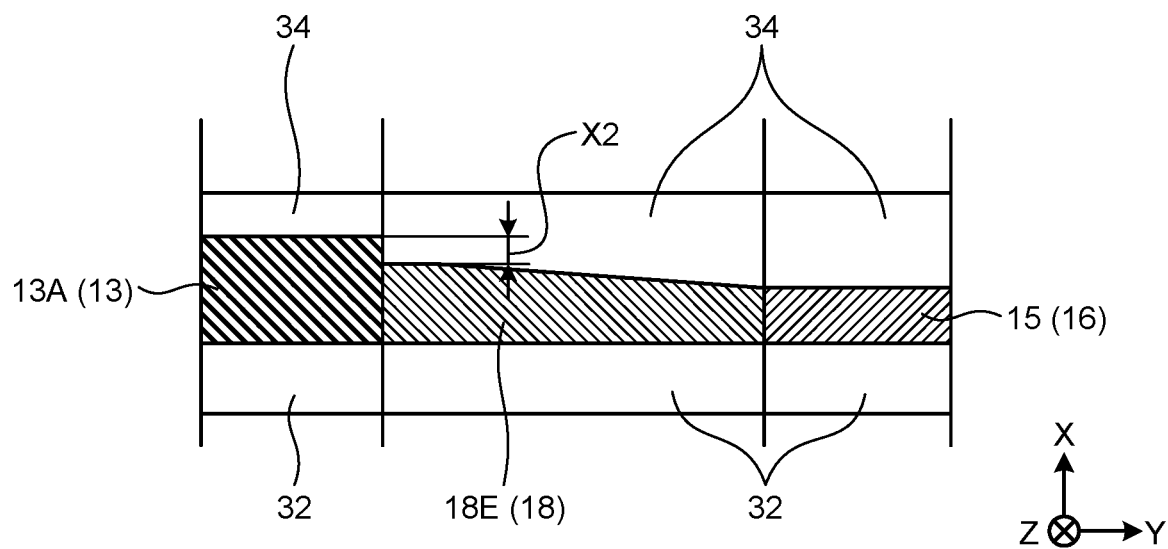
FIG. 9B is an explanatory diagram illustrating an example of the joining unit.

Furthermore, as an example, the structure of the joining unit 18 that joins the first optical waveguide 13 and the second optical waveguide 16 (the multiplexing unit 15) has a tapered structure that is gradually and continuously thinner from the core of the first optical waveguide 13 toward the core of the second optical waveguide 16. However, the tapered structure of the core of the joining unit 18 is not limited to this, and need not be continuously thinner as illustrated in FIG. 9B. FIG. 9B is an explanatory diagram illustrating an example of a joining unit 18E. In the joining unit 18E illustrated in FIG. 9B, even when, for example, a step X2 of 0.1 µm is generated with respect to the first optical waveguide 13, it is possible to improve the coupling efficiency as compared to the case in which the first optical waveguide 13 and the second optical waveguide 16 illustrated in FIG. 4 are directly connected.

[d] Fourth Embodiment

Figure 10:
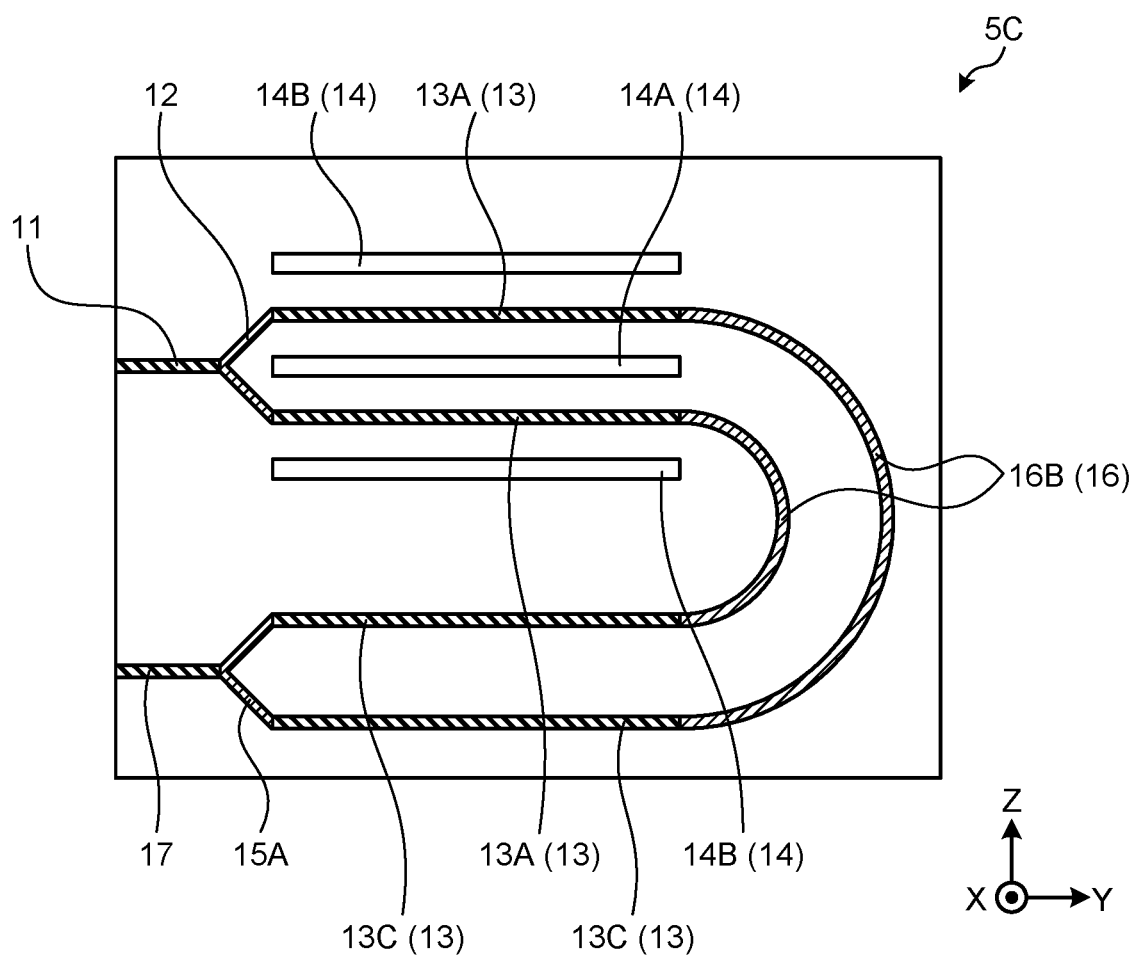
FIG. 10 is a schematic plan view illustrating an example of a configuration of an optical modulator according to a fourth embodiment.

FIG. 10 is a schematic plan view illustrating an example of a configuration of an optical modulator 5C according to a fourth embodiment. Furthermore, by assigning the same reference numerals to components having the same configuration as those in the optical modulator 5 according to the first embodiment, overlapped descriptions of the configuration and the operation thereof will be omitted. The optical modulator 5C illustrated in FIG. 10 includes the input unit 11, the branching unit 12, the two first optical waveguides 13A (13) disposed on the outbound side, the electrode unit 14, and two U-shaped second optical waveguides 16B (16). Moreover, the optical modulator 5C includes the two pieces of first optical waveguides 13C (13) disposed on the inbound side, a multiplexing unit 15A, and the output unit 17.

The input unit 11 inputs light output from the optical fiber 4A. The branching unit 12 branches the light received from the input unit 11. The two first optical waveguides 13A disposed on the outbound side are the optical waveguides that are disposed in parallel and that function as the interaction units of the MZ section for modulating each of the light beams branched off at the branching unit 12. The electrode unit 14 applies an electrical signal to the two first optical waveguides 13A disposed on the outbound side. The two first optical waveguides 13A disposed on the outbound side modulates light by changing the optical refractive index in accordance with the electrical signal received from the electrode unit 14.

The two second optical waveguides 16B are U-shaped optical waveguides that are connected to the two respective first optical waveguides 13A disposed on the outbound side and through which the light modulated in the two first optical waveguides 13A disposed on the outbound side passes. The two first optical waveguides 13C disposed on the inbound side are optical waveguides that are connected to the two respective second optical waveguides 16B. The multiplexing unit 15A multiplexes the modulated light passing through the two first optical waveguides 13C disposed on the inbound side. The output unit 17 outputs the modulated light that has been multiplexed by the multiplexing unit 15A to the optical fiber 2A.

The thickness of the core of each of the two first optical waveguides 13A disposed on the outbound side, the two first optical waveguides 13C disposed on the inbound side, the input unit 11, and the output unit 17 is defined as Ha. The thickness of the core of each of the second optical waveguide 16B, the branching unit 12, and the multiplexing unit 15A is defined as Hb. In other words, the core of each of the two first optical waveguides 13A disposed on the outbound side, the first optical waveguide 13B disposed on the inbound side, the input unit 11, and the output unit 17 is made thicker than the core of the second optical waveguide 16B.

The length of the waveguide functioning as the interaction unit corresponds to the distance of an optical path length obtained by adding a waveguide length of each of the first optical waveguide 13A disposed on the outbound side, the second optical waveguide 16B, and the first optical waveguide 13C disposed on the inbound side. As a result, in the optical modulator 5C according to the fourth embodiment, the waveguide length of the interaction unit is longer than that of the optical modulator 5 according to the first embodiment, so that modulation efficiency is increased.

In the optical modulator 5C according to the fourth embodiment, the thickness of the core of each of the two first optical waveguides 13A disposed on the outbound side, the two first optical waveguides 13C disposed on the inbound side, the input unit 11, and the output unit 17 is made thicker than the core of a second optical waveguide 16C. As a result, it is possible to improve the modulation efficiency and the coupling efficiency while preventing crosstalk.

In addition, a case has been described as an example in which, in the optical modulator 5C according to the fourth embodiment, an electrical signal received from the electrode unit 14 is applied to the two first optical waveguides 13A disposed on the outbound side. However, in addition to the two first optical waveguides 13A disposed on the outbound side, the interaction unit may also be disposed in the two first optical waveguides 13C disposed on the inbound side, and an embodiment thereof will be described below as a fifth embodiment.

[e] Fifth Embodiment

Figure 11:
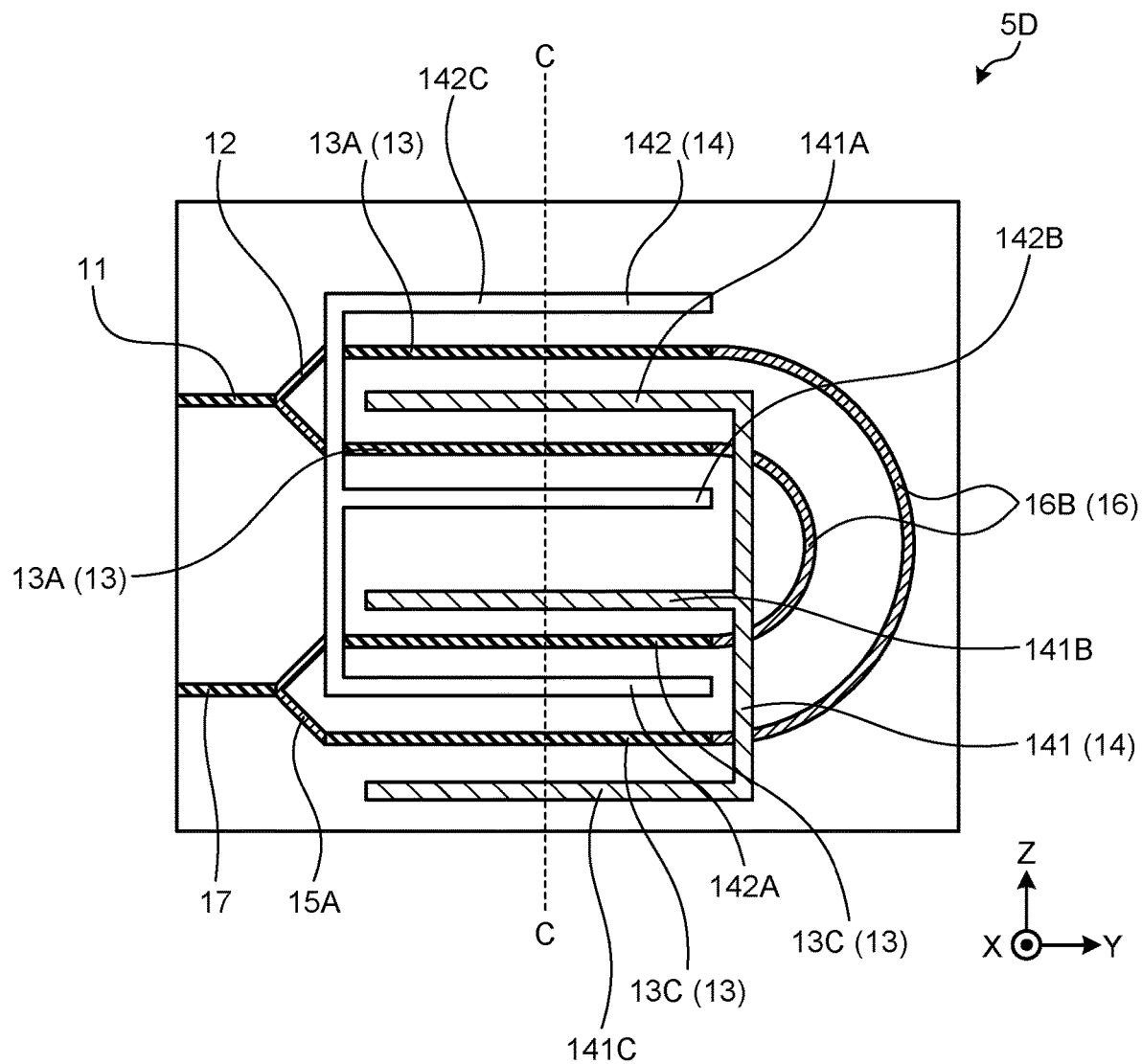
FIG. 11 is a schematic plan view illustrating an example of a configuration of an optical modulator according to a fifth embodiment.

FIG. 11 is a schematic plan view illustrating an example of a configuration of an optical modulator 5D according to the fifth embodiment. Furthermore, by assigning the same reference numerals to components having the same configuration as those in the optical modulator 5C according to the fourth embodiment, overlapped descriptions of the configuration and the operation thereof will be omitted. The optical modulator 5D illustrated in FIG. 11 includes the input unit 11, the branching unit 12, the two first optical waveguides 13A disposed on the outbound side, and the two second optical waveguides 16B. Moreover, the optical modulator 5D includes the two first optical waveguides 13C disposed on the inbound side, a first electrode unit 141 (14), a second electrode unit 142 (14), the multiplexing unit 15A, and the output unit 17.

The input unit 11 inputs light output from the optical fiber 4A. The branching unit 12 branches the light received from the input unit 11. The two first optical waveguides 13A disposed on the outbound side are optical waveguides that are disposed in parallel and that function as an interaction unit of the MZ section for modulating each of the light beams that are branched off at the branching unit 12. The two second optical waveguides 16B are U-shaped optical waveguides that are connected to the two respective first optical waveguides 13A disposed on the outbound side. The two first optical waveguides 13C disposed on the inbound side are optical waveguides that are disposed in parallel and that function as an interaction unit of the MZ section connected to the two respective second optical waveguides 16B.

One of the first optical waveguides 13A disposed on the outbound side is connected to one of the second optical waveguides 16B, and the one of the second optical waveguides 16B is connected to the one of the first optical waveguides 13C disposed on the inbound side. The other of the first optical waveguide 13A disposed on the outbound side is connected to the other of the second optical waveguides 16B, and the other of the second optical waveguides 16B is connected to the other of the first optical waveguides 13C disposed on the inbound side.

The first electrode unit 141 includes a first electrode 141A that is disposed between the two first optical waveguides 13A that are disposed on the outbound side, a second electrode 141B and a third electrode 141C that are disposed on the outer side of the two first optical waveguides 13C that are disposed on the inbound side. The second electrode unit 142 includes a fourth electrode 142A that is disposed between the two first optical waveguides 13C that are disposed on the inbound side, and a fifth electrode 142B and a sixth electrode 142C that are disposed on the outer side of the two first optical waveguides 13A that are disposed on the outbound side. The second electrode unit 142 is formed such that electric potential thereof is higher than the electric potential of the first electrode unit 141.

Figure 12:
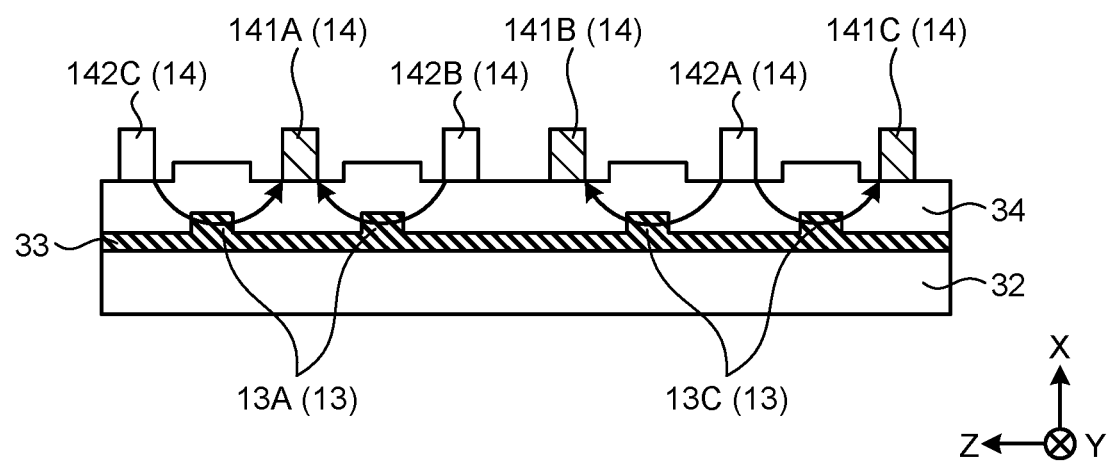
FIG. 12 is a schematic cross-sectional view illustrating an example of a cross-sectional portion taken along line C-C in FIG. 11.

FIG. 12 is a schematic cross-sectional view illustrating an example of a cross-sectional portion taken along line C-C in FIG. 11. One of the first optical waveguides 13A disposed on the outbound side applies an electric field from the sixth electrode 142C included in the second electrode unit 142 to the first electrode 141A included in the first electrode unit 141 in a negative Z direction. One of first optical waveguides 14C disposed on the inbound side applies an electric field from the fourth electrode 142A included in the second electrode unit 142 to the third electrode 141C included in the first electrode unit 141 in the negative Z direction. As a result, the electric field direction applied to one of the first optical waveguides 13A disposed on the outbound side and one of the first optical waveguides 13C disposed on the inbound side is the same direction as the negative Z direction, so that a phase change occurs in the same direction, and thus, the modulation efficiency is improved.

The other of the first optical waveguides 13A disposed on the outbound side applies an electric field from the fifth electrode 142B included in the second electrode unit 142 to the first electrode 141A included in the first electrode unit 141 in the positive Z direction. The other of the first optical waveguides 13C disposed on the inbound side applies an electric field from the fourth electrode 142A included in the second electrode unit 142 to the second electrode 141B included in the first electrode unit 141 in the positive Z direction. As a result, the electric field direction of the electric field applied to the other of the first optical waveguides 13A disposed on the outbound side and the other of the first optical waveguides 13C disposed on the inbound side is the same direction as the positive Z, so that a phase change occurs in the same direction, and thus, the modulation efficiency is improved.

The multiplexing unit 15A multiplexes the modulated light passing through the two first optical waveguides 13C disposed on the inbound side. The output unit 17 outputs the modulated light that has been multiplexed by the multiplexing unit 15A to the optical fiber 4A.

The thickness of the core of each of the two first optical waveguides 13A disposed on the outbound side, the two first optical waveguides 13C disposed on the inbound side, the input unit 11, and the output unit 17 is defined as Ha. The thickness of the core of each of the second optical waveguide 16B, the branching unit 12, and the multiplexing unit 15A is defined as Hb. In other words, the core of each of the two first optical waveguides 13A disposed on the outbound side, the first optical waveguide 13C disposed on the inbound side, the input unit 11, and the output unit 17 is made thicker than the core of the second optical waveguide 16B.

In the optical modulator 5D according to the fifth embodiment, the thickness of the core of each of the two first optical waveguides 13A disposed on the outbound side, the two first optical waveguides 13C disposed on the inbound side, the input unit 11, and the output unit 17 is made thicker than the core of the second optical waveguide 16B. As a result, it is possible to improve the modulation efficiency and the coupling efficiency while preventing crosstalk.

In the optical modulator 5D, by applying an electric field to the two first optical waveguides 13A disposed on the outbound side and the two first optical waveguides 13C disposed on the inbound side that are located before and after the U-shaped section, it is possible to improve the modulation efficiency and implement a size reduction.

In addition, in the optical modulator 5C according to the fourth embodiment, a case has been described as an example in which the electrode unit 14 is disposed in the first optical waveguides 13A disposed on the outbound side to function as the interaction units. However, instead of the first optical waveguides 13A disposed on the outbound side, the other electrode unit 14 may be disposed in the first optical waveguides 13C disposed on the inbound side to function as the interaction units, and an embodiment thereof will be described below as a sixth embodiment.

[f] Sixth Embodiment

Figure 13:
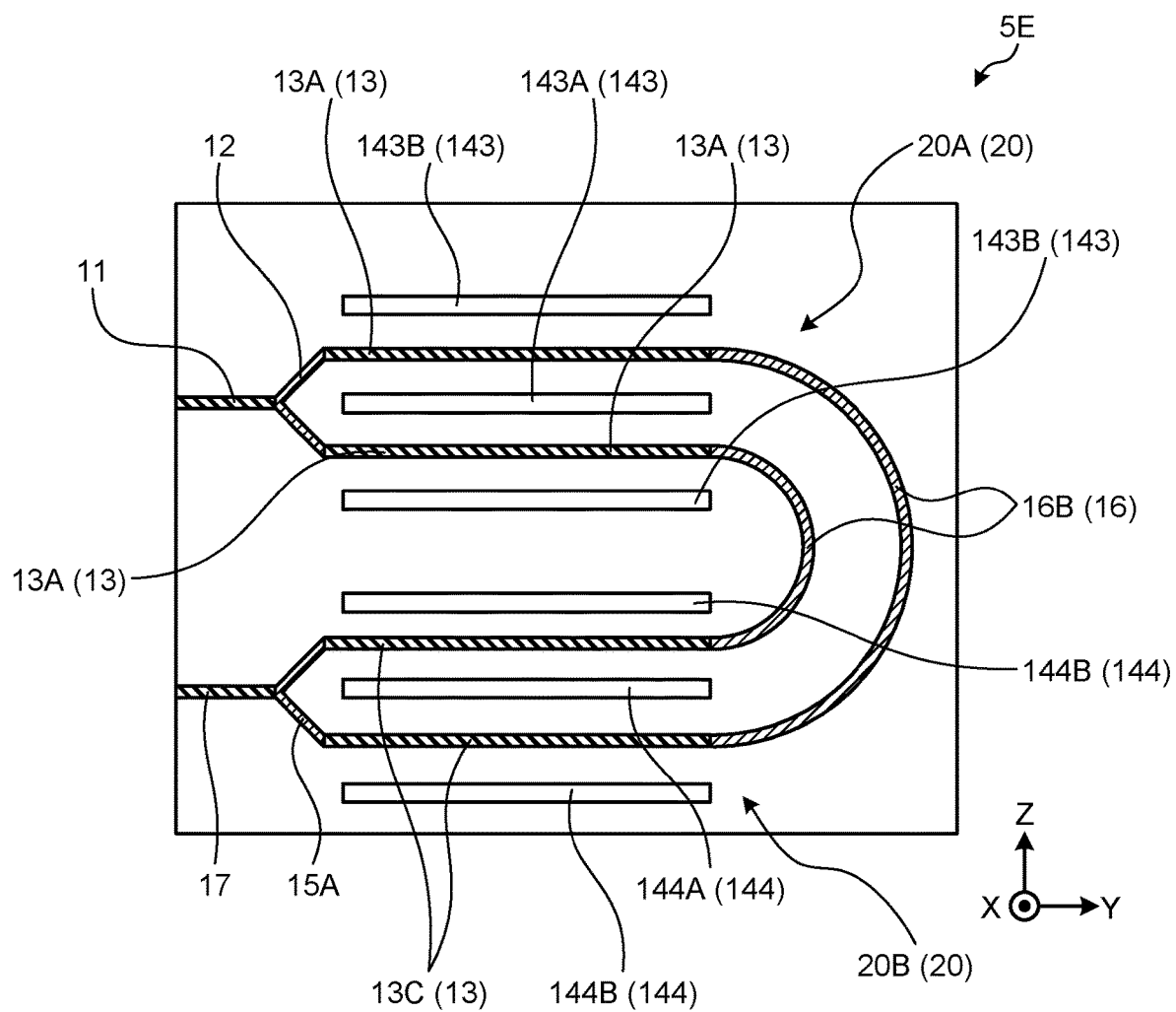
FIG. 13 is a schematic plan view illustrating an example of a configuration of an optical modulator according to a sixth embodiment.

FIG. 13 is a schematic plan view illustrating an example of a configuration of an optical modulator 5E according to the sixth embodiment. Furthermore, by assigning the same reference numerals to components having the same configuration as those in the optical modulator 5C according to the fourth embodiment, overlapped descriptions of the configuration and the operation thereof will be omitted. The optical modulator 5E illustrated in FIG. 13 includes the input unit 11, the branching unit 12, the two first optical waveguides 13A disposed on the outbound side, a third electrode unit 143, the second optical waveguide 16B, the two first optical waveguides 13C disposed on the inbound side, a fourth electrode unit 144, the multiplexing unit 15A, and the output unit 17.

The input unit 11 inputs the light output from the optical fiber 4A. The branching unit 12 branches the light received from the input unit 11. The two first optical waveguides 13A disposed on the outbound side are the first optical waveguides 13 that are disposed in parallel and that function the interaction units of the MZ section for modulating each of the light beams branched off at the branching unit 12. The third electrode unit 143 includes a signal electrode 143A that applies the first electrical signal to the two first optical waveguides 13A disposed on the outbound side, and a ground electrode 143B that grounds the first electrical signal received from the two first optical waveguides 13A disposed on the outbound side. Furthermore, a first modulating unit 20A (20) is constituted by the two first optical waveguides 13A disposed on the outbound side and the third electrode unit 143. A first modulating unit 20A is, for example, a Direct Current (DC) modulating unit that applies a bias voltage as the first electrical signal from the third electrode unit 143 to the two first optical waveguides 13A disposed on the outbound side.

The second optical waveguides 16B are U-shaped optical waveguides that are disposed in parallel, that are connected to the two respective first optical waveguides 13A disposed on the outbound side, and through which the light modulated in the two first optical waveguides 13A disposed on the outbound side passes.

The two first optical waveguides 13C disposed on the inbound side are the first optical waveguides 13 that are disposed in parallel and that are connected to the two respective second optical waveguides 16B. The fourth electrode unit 144 includes a signal electrode 144A that applies the second electrical signal to the two first optical waveguides 13C disposed on the inbound side, and a ground electrode 144B that grounds the second electrical signal from the two pieces of the first optical waveguides 13C disposed on the inbound side. Furthermore, a second modulating unit 20B (20) is constituted from the two first optical waveguides 13C disposed on the inbound side and the fourth electrode unit 144. The second modulating unit 20B is, for example, a radio frequency (RF) modulating unit in which the fourth electrode unit 144 applies a high-frequency signal as the second electrical signal to the two first optical waveguides 13C disposed on the inbound side.

The multiplexing unit 15A is connected to the two first optical waveguides 13C disposed on the inbound side, and multiplexes each of the modulated light beams passing through the two first optical waveguides 13C disposed on the inbound side. The output unit 17 outputs the modulated light multiplexed by the multiplexing unit 15A to the optical fiber 2A.

The thickness of the core of each of the two first optical waveguides 13A disposed on the outbound side, the two first optical waveguides 13C disposed on the inbound side, the input unit 11, and the output unit 17 is defined as Ha. The thickness of the core of each of the second optical waveguide 16B, the branching unit 12, and the multiplexing unit 15A is defined as Hb. In other words, the core of the two first optical waveguides 13A disposed on the outbound side, the first optical waveguide 13C disposed on the inbound side, the input unit 11, and the output unit 17 is made thicker than the core of the second optical waveguide 16B.

In the optical modulator 5E according to the sixth embodiment, the thickness of the core of each of the two first optical waveguides 13A disposed on the outbound side, the two first optical waveguides 13C disposed on the inbound side, the input unit 11, and the output unit 17 is made thicker than the core of the second optical waveguide 16B. As a result, even when the first modulating unit 20A is disposed on the front stage of the U-shaped section and the second modulating unit 20B is disposed on the rear stage of the U-shaped section, it is possible to improve the modulation efficiency and the coupling efficiency while preventing crosstalk.

In addition, for convenience of description, a case has been described as an example in which the first modulating unit 20A is assumed to be the DC modulating unit, whereas the second modulating unit 20B is assumed to be the RF modulating unit; however, the example is not limited to this. For example, the second modulating unit 20B may be used as the DC modulating unit, and appropriate modifications are possible.

[g] Seventh Embodiment

Figure 14:
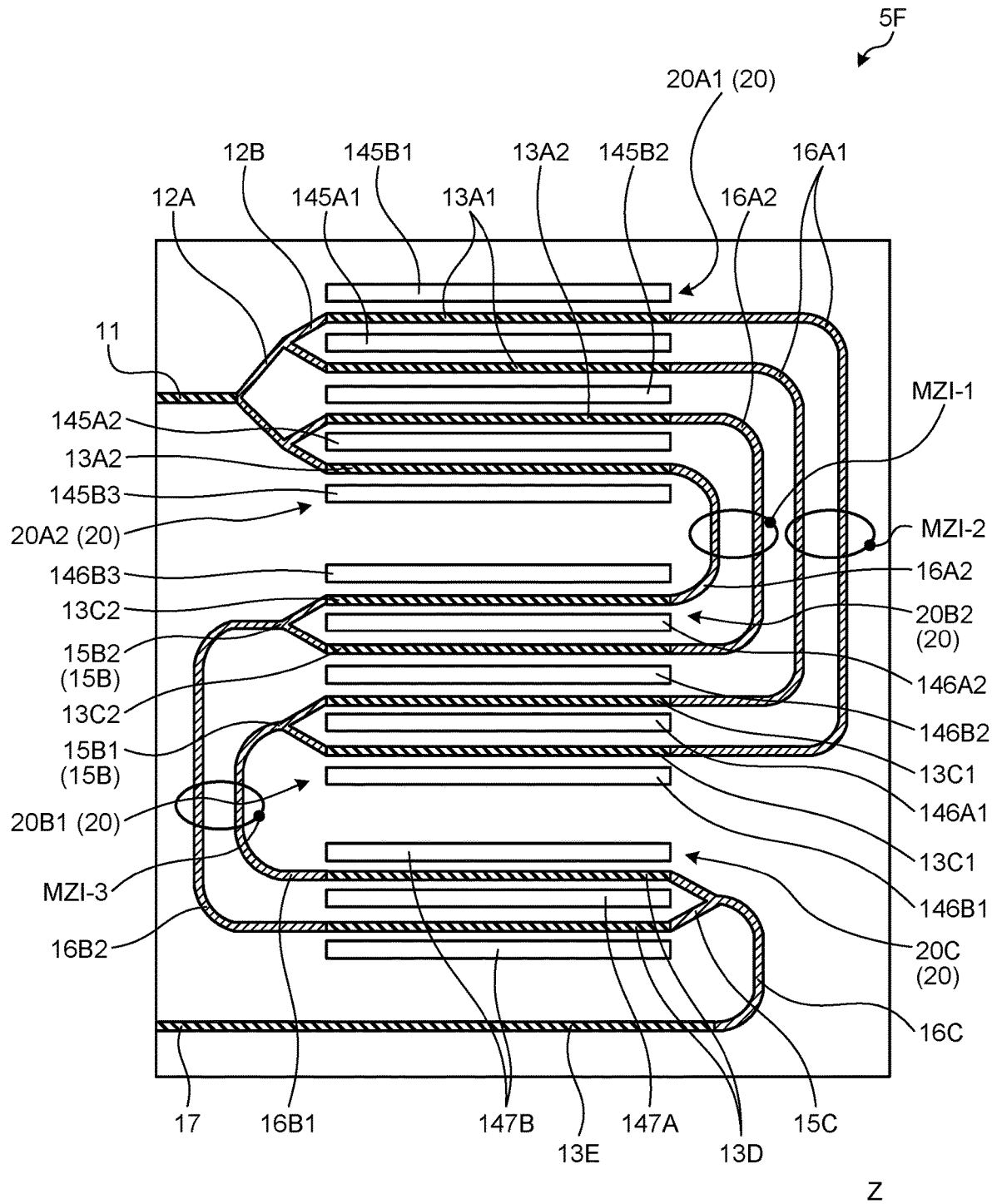
FIG. 14 is a schematic plan view illustrating an example of a configuration of an optical modulator according to a seventh embodiment.

FIG. 14 is a schematic plan view illustrating an example of a configuration of an optical modulator 5F according to a seventh embodiment. The optical modulator 5F illustrated in FIG. 14 is an IQ modulator. The optical modulator 5F includes the input unit 11, a first branching unit 12A, a pair of second branching units 12B, two first optical waveguides 13A1 and 13A2 disposed on the outbound side in the front stage, a fifth electrode unit 145, and second optical waveguides 16A1 and 16A2 disposed in the front stage. The optical modulator 5F includes two first optical waveguides 13C1 and 13C2 disposed on the inbound side in the front stage, a sixth electrode unit 146, a pair of first multiplexing units 15B, and two second optical waveguides 16B1 and 16B2 disposed in the middle stage. Moreover, the optical modulator 5F includes two first optical waveguides 13D disposed on the outbound side in the rear stage, a seventh electrode unit 147, the second optical waveguide 16C disposed in the rear stage, an optical waveguide 13E disposed on the inbound side in the rear stage, and the output unit 17.

The input unit 11 inputs light that is output from the optical fiber 4A. The first branching unit 12A branches the light received from the input unit 11. Each of the second branching units 12B outputs the light that has been branched off at the first branching unit 12A to the respective two first optical waveguides 13A1 and 13A2 disposed on the outbound side that modulate the light.

The two first optical waveguides 13A1 and 13A2 disposed on the outbound side in the front stages are optical waveguides that are disposed in parallel and function as the interaction units of the MZ section for modulating each of the light beams that are branched off at the second branching unit 12B. The fifth electrode unit 145 includes a pair of a first signal electrode 145A1 and a second signal electrode 145A2, a first ground electrode 145C1, and a pair of a second ground electrode 145C2 and a third ground electrode 145C3. The first signal electrode 145A1 applies the first electrical signal to one of the two first optical waveguides 13A1 disposed on the outbound side in the front stage. A first ground electrode 145B1 grounds the first electrical signal from one of the first optical waveguides 13A1 out of the two first optical waveguides 13A1 disposed on the outbound side. A second ground electrode 145B2 grounds the first electrical signal from the other of the first optical waveguide 13A1 out of the two first optical waveguides 13A1 disposed on the outbound side in the front stage. One of the first optical waveguides 13A1 and the fifth electrode unit 145 disposed on the outbound side in the front stage correspond to a first RF modulating unit 20A1.

The second signal electrode 145A2 applies the second electrical signal to the other of the two first optical waveguides 13A2 disposed on the outbound side in the front stage. A third ground electrode 145B3 grounds the second electrical signal from the other of the first optical waveguides 13A2 disposed on the outbound side in the front stage out of the other of the two first optical waveguides 13A2 disposed on the outbound side in the front stage. The second ground electrode 145B2 grounds the second electrical signal from one of the first optical waveguides 13A2 disposed on the outbound side in the front stage out of the other of the two first optical waveguides 13A2 disposed on the outbound side in the front stage. The other of the first optical waveguide 13A2 and the fifth electrode unit 145 disposed on the outbound side in the front stage correspond to a second RF modulating unit 20A2.

The second optical waveguides 16A disposed in the front stage are disposed in parallel and each of which includes one of the two second optical waveguides 16A1 disposed in the front stage and the other of the two second optical waveguides 16A2 disposed in the front stage. One of the two second optical waveguides 16A1 disposed in the front stage is a U-shaped optical waveguide that is connected to one of the two first optical waveguides 13A1 disposed on the outbound side and through which the light that has been modulated in one of the two first optical waveguides 13A1 disposed on the outbound side in the front stage passes. The other of the two second optical waveguides 16A2 disposed in the front stage is a U-shaped optical waveguide that is connected to the other of the two first optical waveguides 13A2 disposed on the outbound side in the front stage and through which the light that has been modulated in the other of the two first optical waveguides 13A2 disposed on outbound side in the front stage passes.

The two first optical waveguides 13C1 disposed, on one side, on the inbound side in the front stage are the first optical waveguides that are disposed in parallel and that are connected to the respective two second optical waveguides 16A1 disposed, on one side, in the front stage. The two first optical waveguides 13C2 disposed, on the other side, on the inbound side in the front stage are the first optical waveguides that are disposed in parallel and that are connected to the two second optical waveguides 16A2 disposed, on the other side, in the front stage.

The sixth electrode unit 146 includes a pair of the first signal electrode 146A1 and a second signal electrode 146A2, a first ground electrode 146B1, and a pair of a second ground electrode 146B2 and a third ground electrode 146B3. The first signal electrode 146A1 included in the sixth electrode unit 146 applies the third electrical signal to the two first optical waveguides 13C1 disposed, on one side, on the inbound side in the front stage. The first ground electrode 146B1 included in the sixth electrode unit 146 grounds the third electrical signal from one of the first optical waveguide 13C1 disposed, on the one side, on the inbound side in the front stage out of the two first optical waveguides 13C1 disposed, on one side, on the inbound side in the front stage. The second ground electrode 146B2 included in the sixth electrode unit 146 grounds the third electrical signal from the first optical waveguide 13C1 disposed, on the other side, on the inbound side in the front stage out of one of the two first optical waveguides 13C1 disposed, on one side, on the inbound side in the front stage. The first optical waveguides 13C1 disposed, on one side, on the inbound side in the front stage and the sixth electrode unit 146 correspond to a first DC modulating unit 20B1 (20).

The second signal electrode 146A2 included in the sixth electrode unit 146 applies the fourth electrical signal to the two first optical waveguides 13C2 disposed, on one side, on the inbound side in the front stage. the third ground electrode 146B3 included in the sixth electrode unit 146 grounds the fourth electrical signal from the first optical waveguide 13C2 disposed, on the other side, on the inbound side in the front stage out of the two first optical waveguides 13C2 disposed, on the other side, on the inbound side in the front stage. The second ground electrode 146B2 included in the sixth electrode unit 146 grounds the fourth electrical signal from the first optical waveguides 13C2 disposed, on one side, on the inbound side in the front stage out of the two first optical waveguides 13C2 disposed, on the other side, on the inbound side in the front stage. The first optical waveguide 13C2 disposed, on the other side, on the inbound side in the front stage and the sixth electrode unit 146 corresponds to a second DC modulating unit 20B2 (20).

A first multiplexing unit 15B1 disposed on one side is connected to one of the two first optical waveguides 13C1 disposed on the inbound side in the front stage, and multiplexes the modulated light that has been modulated in and that passes through the two first optical waveguides 13C1 disposed on the inbound side in the front stage. A first multiplexing unit 15B2 disposed on the other side is connected to the two first optical waveguides 13C2 that are disposed, on the other side, on the inbound side in the front stage, and multiplexes the modulated light that has been modulated in and that passes through the two first optical waveguides 13C2 disposed on the inbound side in the front stage.

The second optical waveguides 16B disposed in the middle stage are disposed in parallel and include one of the second optical waveguides 16B1 disposed in the middle stage and the other side of a second optical waveguide 16B2 disposed in the middle stage. One side of the second optical waveguide 16B1 disposed in the middle stage is a U-shaped optical waveguide that is connected to one side of the first multiplexing unit 15B1 and through which the light from one side of the first multiplexing unit 15B1 passes. The other side of the second optical waveguide 16B2 disposed in the middle stage is a U-shaped optical waveguide that is connected to the other side of the first multiplexing unit 15B2 and through which the light from the other side of the first multiplexing unit 15B2 passes.

The two first optical waveguides 13D disposed on the outbound side in the rear stage are the first optical waveguides that are connected to the second optical waveguides 16B1 and 16B2, respectively, disposed in the middle stage. The seventh electrode unit 147 includes a signal electrode 147A that applies the fifth electrical signal to the two first optical waveguides 13D disposed on the outbound side in the rear stage, and a pair of ground electrodes 147B that ground the fifth electrical signal from the respective two first optical waveguides 13D disposed on the outbound side in the rear stage. The two first optical waveguides 13D disposed on the outbound side in the rear stage and the seventh electrode unit 147 correspond to a parent DC modulating unit 20C.

A second multiplexing unit 15C is connected to the two first optical waveguides 13D disposed on the outbound side in the rear stage and multiplexes the light modulated in the two first optical waveguides 13D disposed on the outbound side in the rear stage. The second optical waveguide 16C disposed in the rear stage is a U-shaped optical waveguide that is connected to the second multiplexing unit 15C and through which the light from the second multiplexing unit 15C passes. One piece of the first optical waveguide 13E disposed on the inbound side in the rear stage is the first optical waveguide that is connected to the second optical waveguide 16C disposed in the rear stage. The output unit 17 is connected to the first optical waveguide 13E disposed on the inbound side in the rear stage, and outputs the light received from the first optical waveguide 13E disposed on the inbound side in the rear stage to the optical fiber 2A.

In other words, the optical modulator 5F includes the first RF modulating unit 20A1 and the second RF modulating unit 20A2 that are disposed on the first optical waveguide 13A that is disposed on the outbound side in the front stage, and the first DC modulating unit 20B1 and the second DC modulating unit 20B2 that are disposed on the first optical waveguide 13C that is disposed on the inbound side in the front stage. Moreover, the optical modulator 5F includes the parent DC modulating unit 20C that is disposed on the first optical waveguide 13D that is disposed on the outbound side in the rear stage. As a result, the optical modulator 5F constitutes an IQ modulator.

The thickness of the core of each of the two first optical waveguides 13A1 and 13A2 disposed on the outbound side in the front stage, the two first optical waveguides 13C1 and 13C2 disposed on the inbound side in the front stage, the two first optical waveguides 13D disposed on the outbound side in the rear stage, the first optical waveguide 13E disposed on the inbound side in the rear stage, the input unit 11, and the output unit 17 is defined as Ha. In contrast, the thickness of the core of each of the second optical waveguides 16A1 and 16A2 disposed in the front stage, the second optical waveguides 16B1 and 16B2 disposed in the middle stage, the second optical waveguide 16C disposed in the rear stage, the first branching unit 12A, the second branching unit 12B, the first multiplexing unit 15B, and the second multiplexing unit 15C is defined as Hb. In other words, the core of each of the two first optical waveguides 13A1 and 13A2 that are disposed on the outbound side in the front stage, the two first optical waveguides 13C1 and 13C2 that are disposed on the inbound side in the front stage is made thicker than the core of the second optical waveguide 16. Moreover, the core of each of the two first optical waveguides 13D disposed on the outbound side in the rear stage, the first optical waveguide 13E disposed on the inbound side in the rear stage, the input unit 11, and the output unit 17 is made thicker than the core of the second optical waveguide 16.

In the optical modulator 5F according to the seventh embodiment, the thickness of the core of each of the two first optical waveguides 13A1 and 13A2 disposed on the outbound side in the front stage, the two first optical waveguides 13C1 and 13C2 disposed on the inbound side in the front stage, and the two first optical waveguides 13D disposed on the outbound side in the rear stage is made thicker than the core of the second optical waveguide 16. Moreover, in the optical modulator 5F, the thickness of the core of each of the first optical waveguide 13E disposed on the inbound side in the rear stage, the input unit 11, and the output unit 17 is made thicker than the core of the second optical waveguide 16. As a result, even when the IQ modulator is constituted, it is possible to improve the modulation efficiency and the coupling efficiency while preventing crosstalk.

[h] Eighth Embodiment

Figure 15:
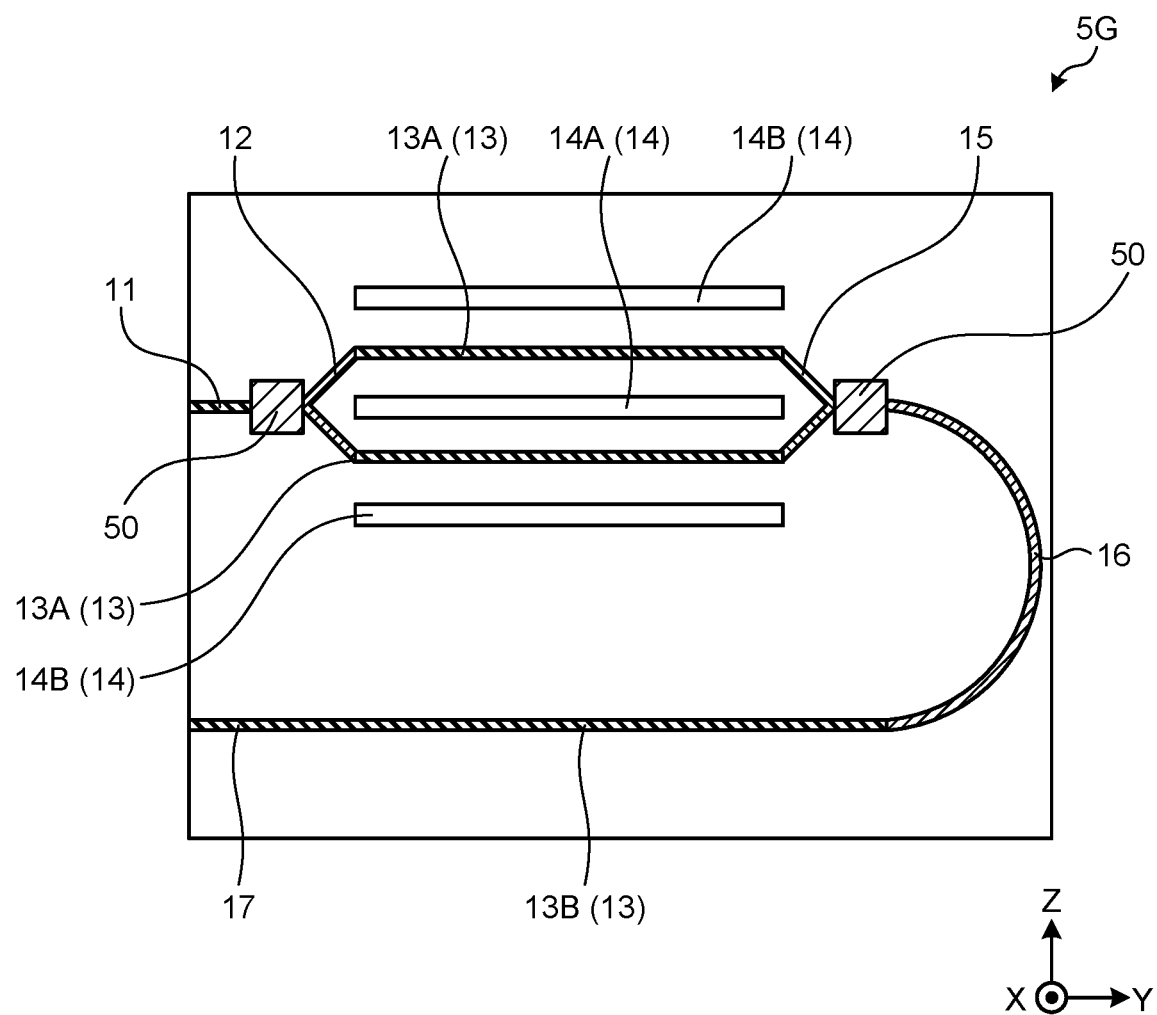
FIG. 15 is a schematic plan view illustrating an example of a configuration of an optical modulator according to an eighth embodiment.

FIG. 15 is a schematic plan view illustrating an example of a configuration of an optical modulator 5G according to an eighth embodiment. Furthermore, by assigning the same reference numerals to components having the same configuration as those in the optical modulator 5 according to the first embodiment, overlapped descriptions of the configuration and the operation thereof will be omitted. The characteristic of the optical modulator 5G according to the eighth embodiment is that the core inside a first coupler 50A (50) included in the branching unit 12 and the core inside a second coupler 50B (50) included in the multiplexing unit 15 are formed to have a thickness that is thinner than the thickness of the core of the first optical waveguide 13 and have a waveguide width that is larger than a waveguide width of the of the core of the second optical waveguide 16.

The first coupler 50A and the second coupler 50B are, for example, multi-mode interference (MMI) couplers. The MMI coupler advantageously exhibits small wavelength dependence. The MMI coupler uses, as a core, multi-mode optical waveguide having the width thereof greater than the width of the second optical waveguide 16. The core of the MMI coupler is formed to have a thickness that is thinner than the thickness of the core of each of the two first optical waveguides 13A disposed on the outbound side and the first optical waveguide 13B disposed on the inbound side.

The optical modulator 5G according to the eighth embodiment is configured such that the thickness of the core inside the first coupler 50A and the thickness of the core inside the second coupler 50B are formed to have a thickness that is thinner than the thickness of the core of each of the first optical waveguide 13A disposed on the outbound side and the first optical waveguide 13B disposed on the inbound side, and formed to have a waveguide width that is larger than the waveguide width of the core of the second optical waveguide 16. As a result, even when the MMI coupler is used, it is possible to improve the modulation efficiency and the coupling efficiency while preventing crosstalk.

[i] Ninth Embodiment

Figure 16:
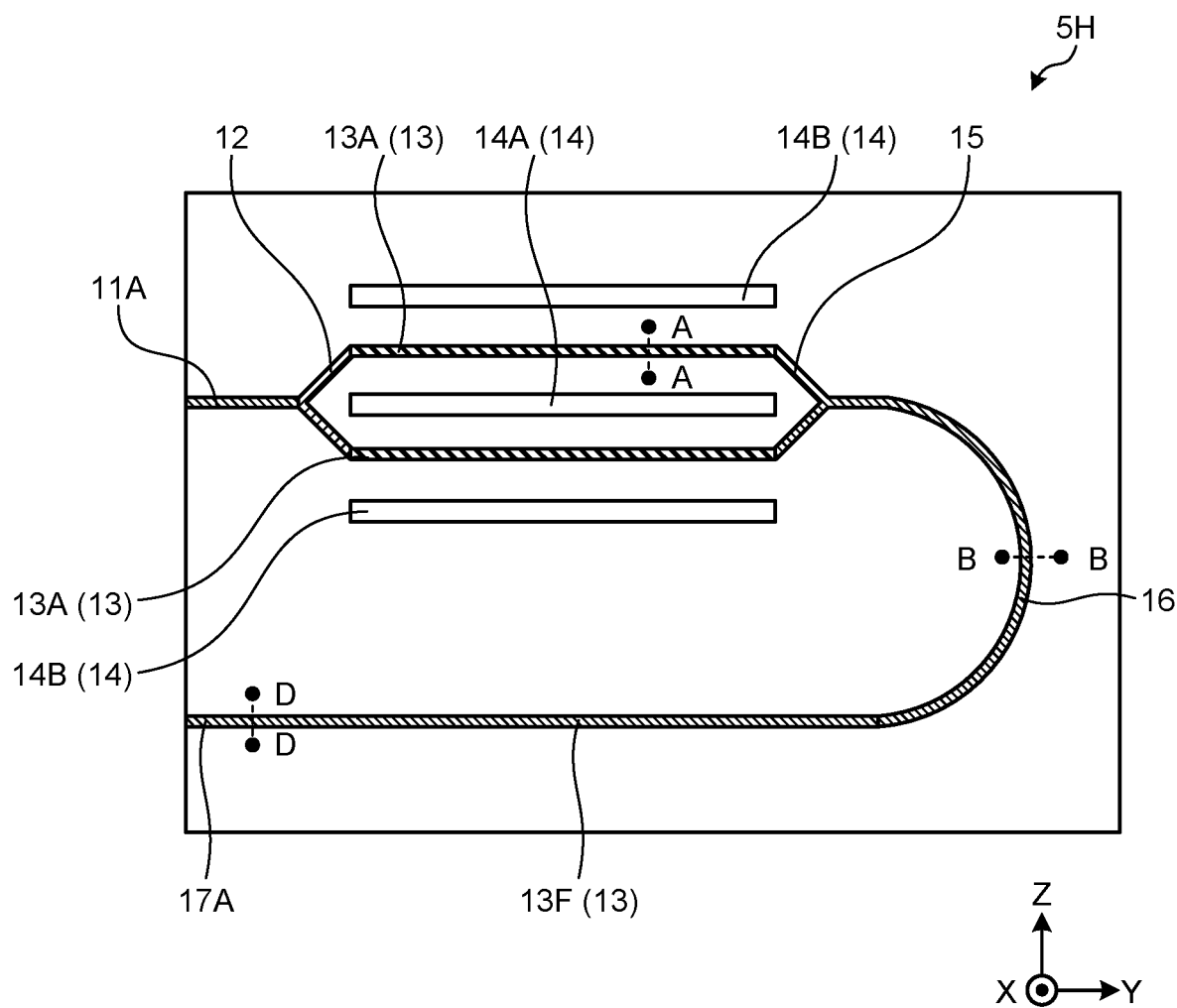
FIG. 16 is a schematic plan view illustrating an example of a configuration of an optical modulator according to a ninth embodiment.
Figure 17A:
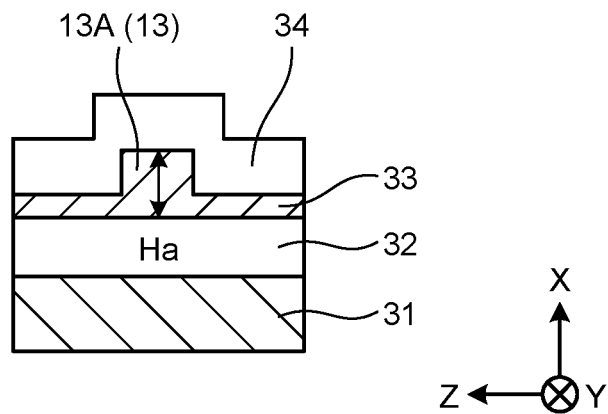
FIGS. 17A, 17B, and 17C are schematic cross-sectional views illustrating a cross-sectional portion taken along line A-A, a cross-sectional portion taken along line B-B, and a cross-sectional portion taken along line D-D in FIG. 16.
Figure 17B:
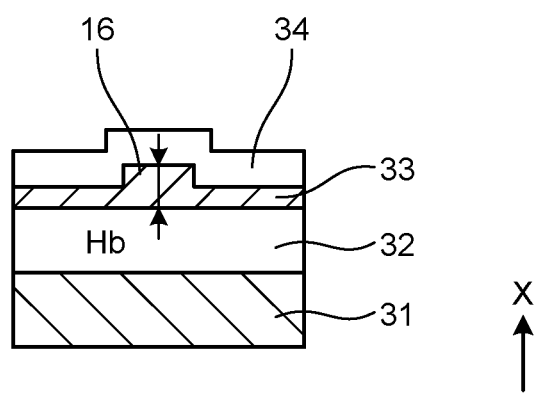
Figure 17C:
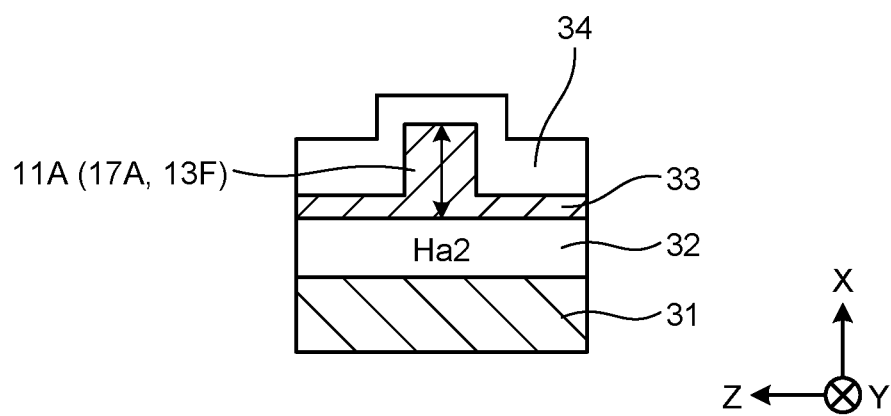
Figure 19:
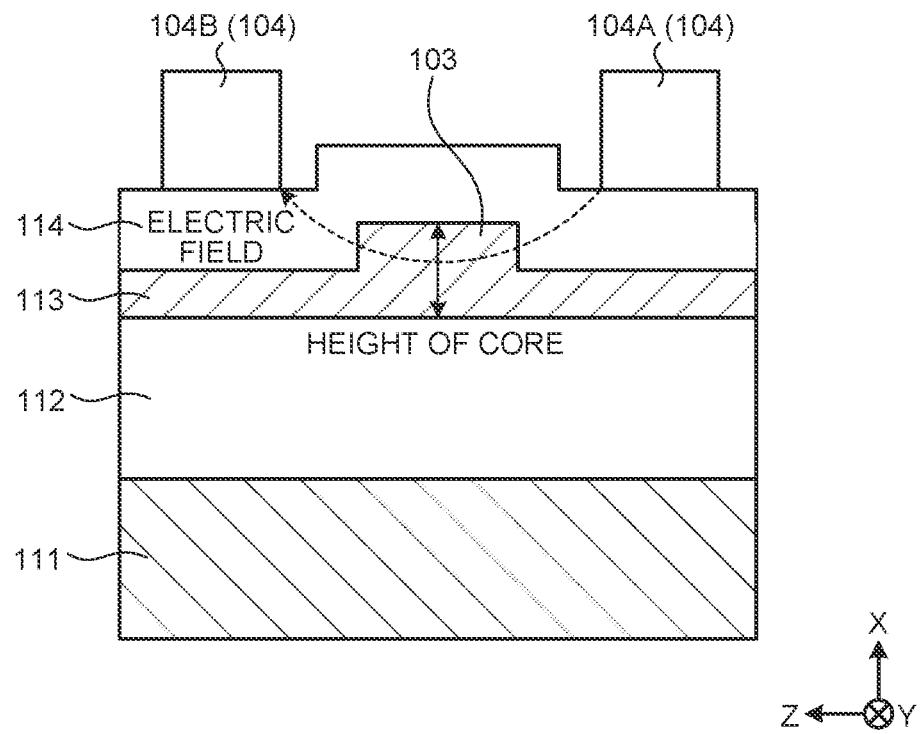
FIG. 19 is a schematic cross-sectional view illustrating an example of a cross-sectional portion taken along line E-E in FIG. 18.
Figure 20A:
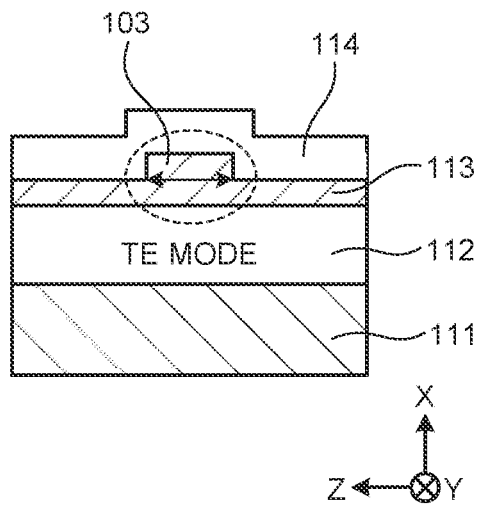
FIGS. 20A and 20B are explanatory diagrams illustrating an example of a TE mode and a TM mode.
Figure 20B:
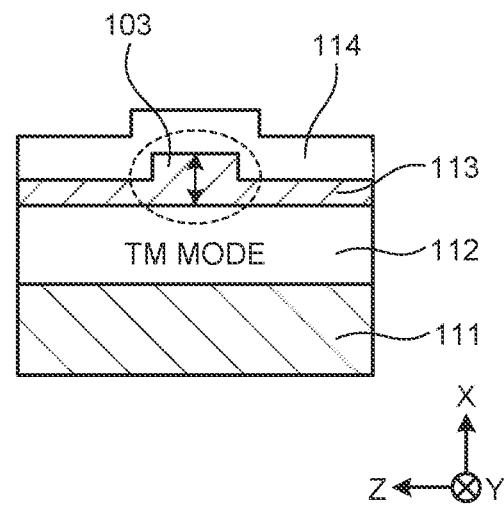
Figure 21:
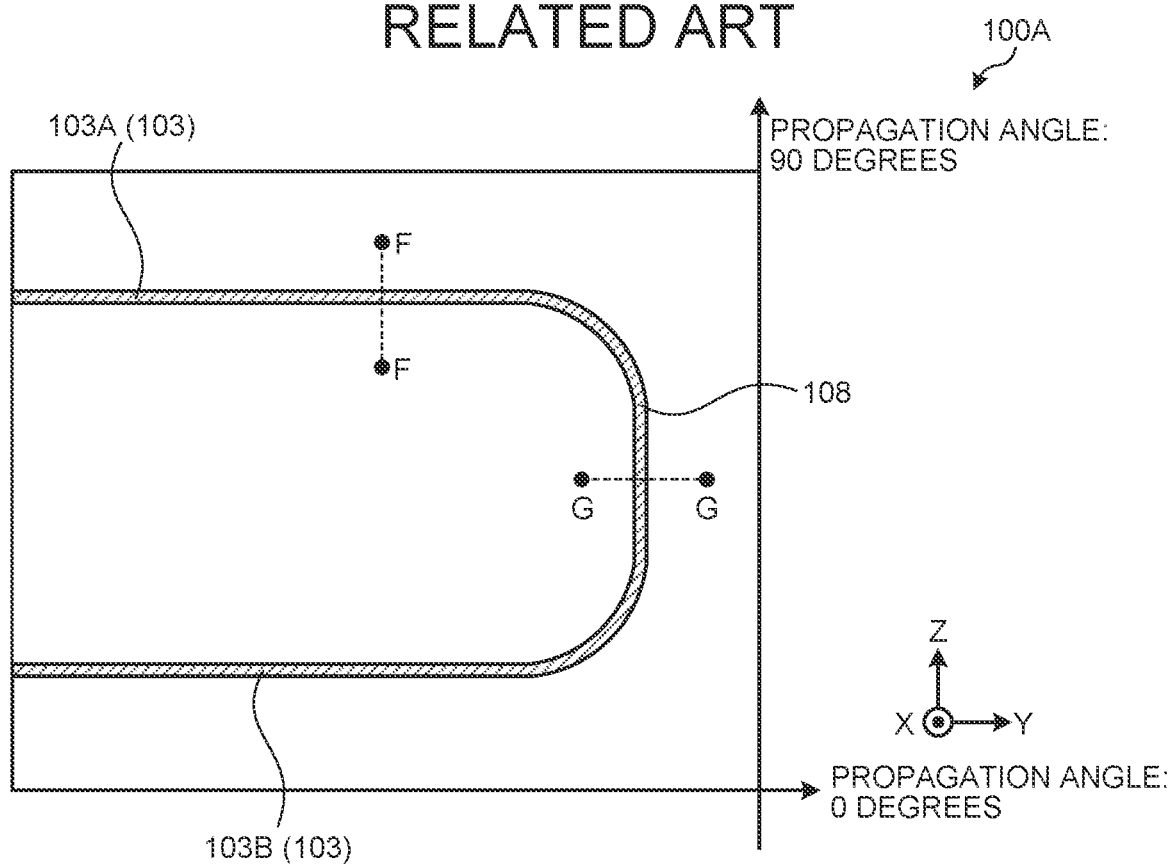
FIG. 21 is a schematic plan view illustrating an example of a configuration of an optical modulator having a U-shaped structure.
Figure 22A:
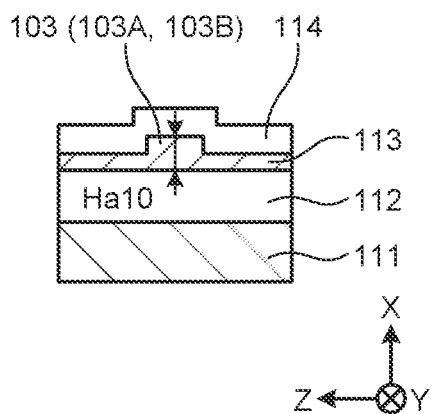
FIGS. 22A and 22B are schematic cross-sectional views illustrating an example of a cross-sectional portion taken along line F-F and a cross-sectional portion taken along line G-G in FIG. 21.
Figure 22B:
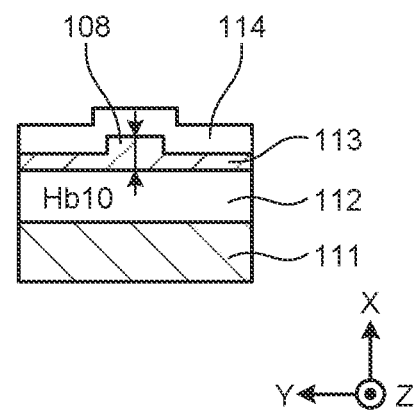
Figure 23A:
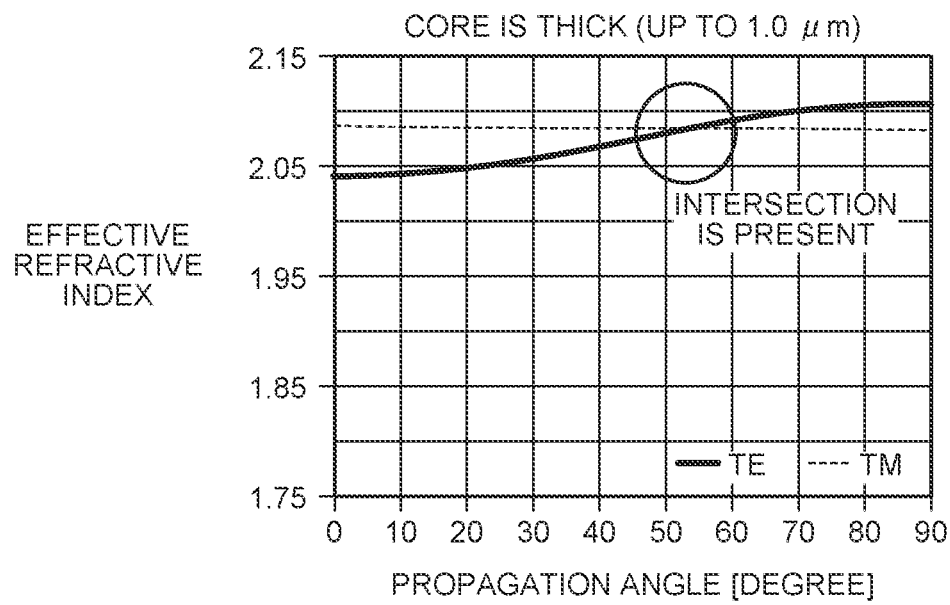
FIG. 23A is an explanatory diagram illustrating an example of a dependence property of a propagation angle with respect to an effective refractive index in the case where the thickness of the core of an optical waveguide is 1 µm.
Figure 23B:
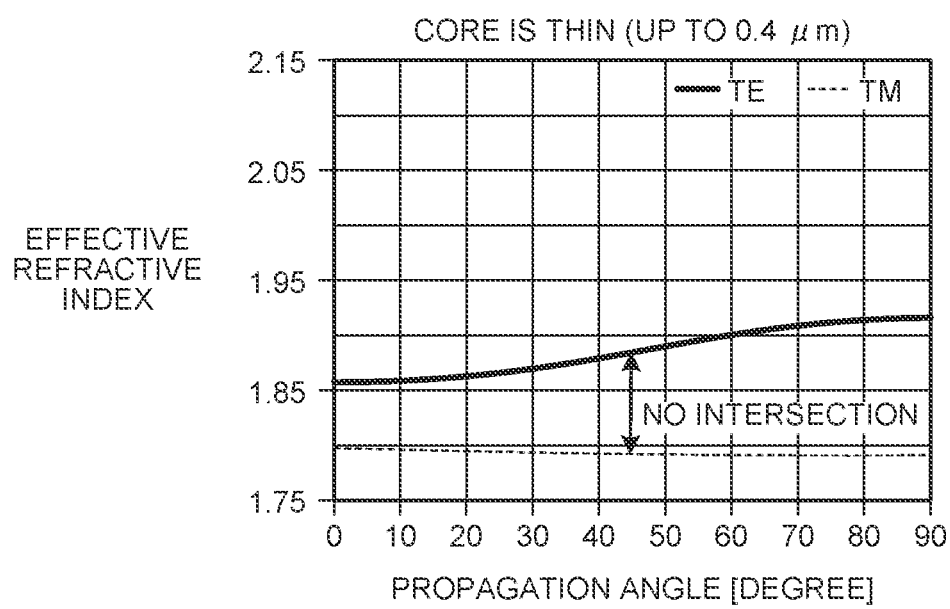
FIG. 23B is an explanatory diagram illustrating an example of a dependence property of a propagation angle with respect to an effective refractive index in the case where the thickness of the core of the optical waveguide is 0.4 µm.
Figure 24:
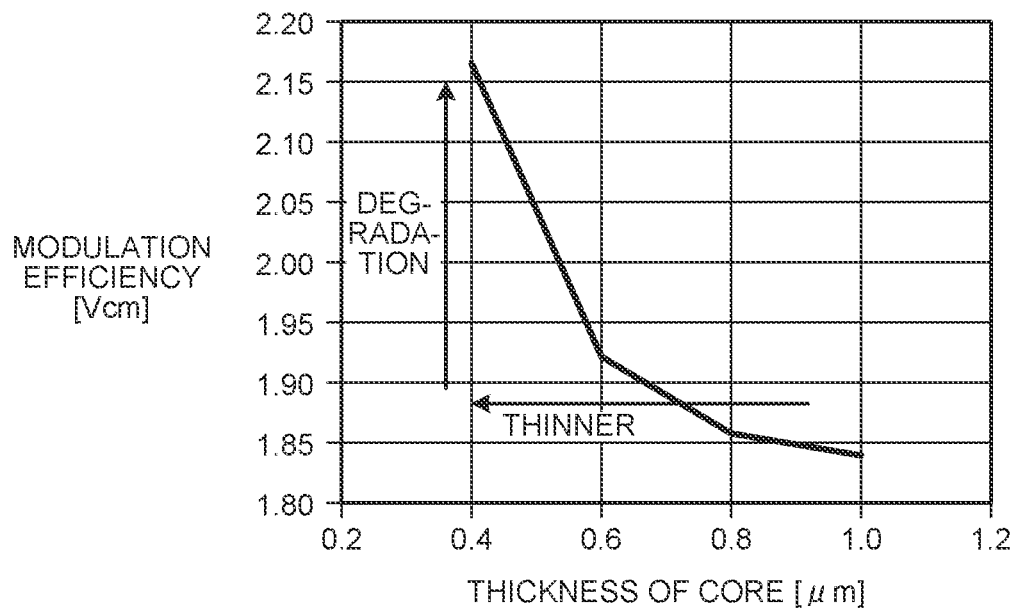
FIG. 24 is an explanatory diagram illustrating an example of a change in modulation efficiency in accordance with the thickness of the core of the optical waveguide.
Figure 25:
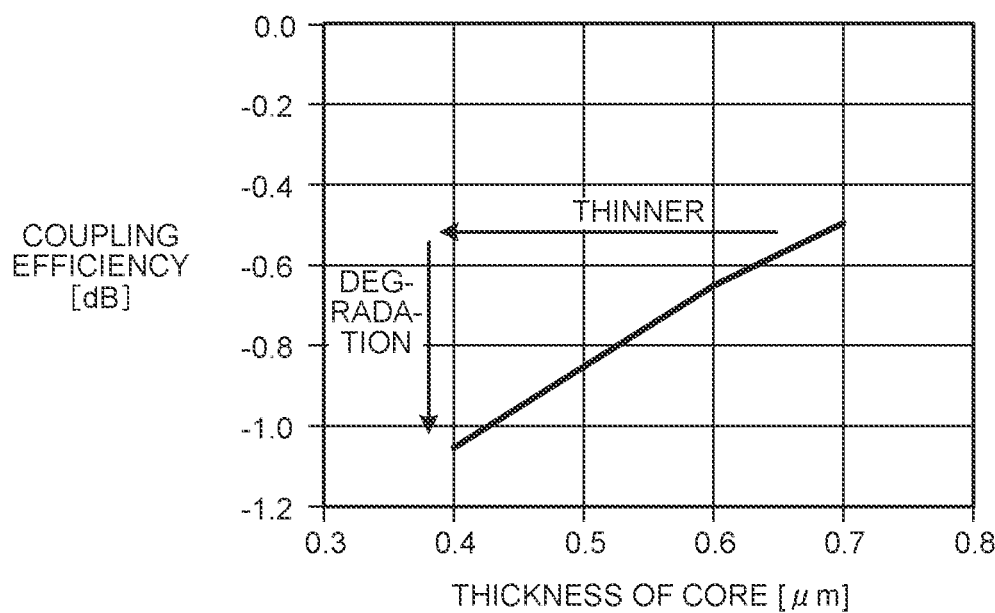
FIG. 25 is an explanatory diagram illustrating an example of a change in coupling efficiency in accordance with the thickness of the core of the optical waveguide.

FIG. 16 is a schematic plan view illustrating an example of a configuration of an optical modulator 5H according to a ninth embodiment. Furthermore, by assigning the same reference numerals to components having the same configuration as those in the optical modulator 5 according to the first embodiment, overlapped descriptions of the configuration and the operation thereof will be omitted. FIGS. 17A, 17B and 17C are schematic cross-sectional views illustrating a cross-sectional portion taken along line A-A, a cross-sectional portion taken along line B-B, and a cross-sectional portion taken along line D-D in FIG. 16. The cross-sectional portion taken along ling A-A corresponds to the portion of the two first optical waveguides 13A disposed on the outbound side. The cross-sectional portion taken along line B-B corresponds to a portion of the branching unit 12, the multiplexing unit 15, and the second optical waveguide 16. The cross-sectional portion taken along line D-D corresponds to a portion of an input unit 11A, a first optical waveguide 13F disposed on the inbound side, and an output unit 17A.

The input unit 11A corresponding to an end surface of a chip of the optical modulator 5H is externally connected to the optical fiber 4A via a lens or the like. The output unit 17A corresponding to the end surface of the chip is externally connected to the optical fiber 2A via a lens or the like. The coupling efficiency of the end surface of the chip of the optical modulator 5H with the optical fibers 4A and 2A increases as the distribution of the optical field increases. Accordingly, the distribution of the optical field depends on the cross-section area of the core, in order to broaden the distribution of the optical field, the width and the thickness of the core of each of the input unit 11A and the output unit 17A are made larger.

The thickness of the core of each of the two first optical waveguides 13A disposed on the outbound side is defined as Ha. The thickness of the core of each of the branching unit 12, the multiplexing unit 15, and the second optical waveguide 16 is defined as Hb. The thickness of the core of each of the input unit 11A, the first optical waveguide 13F disposed on the inbound side, and the output unit 17A is defined as Ha2. The thickness of the core is Ha2>Ha>Hb.

The optical modulator 5H according to the ninth embodiment is configured such that the core of each of the input unit 11A and the output unit 17A is made thicker than the core of the first optical waveguide 13A disposed on the outbound side. As a result, it is possible to improve the coupling efficiency between the input unit 11A and the optical fiber 4A and the coupling efficiency between the output unit 17A and the optical fiber 2A.

In the optical modulator 5H, the core of the first optical waveguide 13F disposed on the inbound side is also made thicker than the core of the first optical waveguide 13A disposed on the outbound side. As a result, it is possible to improve the coupling efficiency as a result of joining being performed by using the same thickness and the same width of the core of a portion between the output unit 17A and the first optical waveguide 13F disposed on the inbound side.

According to an aspect of an embodiment of the optical device or the like disclosed in the present application, the modulation efficiency and the coupling efficiency are improved while preventing crosstalk.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:
1. An optical device comprising:
an X-cut or a Y-cut thin film Lithium Niobate (LN) layer;
a first optical waveguide that is formed on the thin film LN layer along a direction that is substantially perpendicular to a Z direction of a crystal axis of the thin film LN layer;
a second optical waveguide that is routed and connected to the first optical waveguide;
an input unit that inputs light;
a first branching unit that branches the light received from the input unit;
a second branching unit that branches the light branched off at the first branching unit;
two front stage outbound side first optical waveguides
    that are branched off at the second branching unit, and
    that are the first optical waveguide;
a first electrode that applies a first electrical signal to the two front stage outbound side first optical waveguides;
a front stage second optical waveguide
    that is connected to each of the two front stage outbound side first optical waveguides,
    through which the light modulated in the two front stage outbound side first optical waveguides in accordance with the first electrical signal passes, and
    that is the second optical waveguide;
two front stage inbound side first optical waveguides
    that are connected to the front stage second optical waveguide, and
    that are the first optical waveguide;
a second electrode that applies a second electrical signal to the two front stage inbound side first optical waveguides;
a first multiplexing unit
    that is connected to the two front stage inbound side first optical waveguides, and
    that multiplexes the passing modulated light that has been modulated in the two front stage inbound side first optical waveguides in accordance with the second electrical signal;
a middle stage second optical waveguide
    that is connected to the first multiplexing unit,
    through which the light received from the first multiplexing unit passes, and
    that is the second optical waveguide;
two rear stage outbound side first optical waveguides
    that are connected to the middle stage second optical waveguide, and
    that are the first optical waveguide;
a third electrode that applies a third electrical signal to the two rear stage outbound side first optical waveguides;
a second multiplexing unit
    that is connected to the two rear stage outbound side first optical waveguides, and that multiplexes the passing modulated light that has been modulated in the two rear stage outbound side first optical waveguides in accordance with the third electrical signal;
a rear stage second optical waveguide
  that is connected to the second multiplexing unit,
  through which the light received from the second multiplexing unit passes, and
  that is the second optical waveguide;
a rear stage inbound side first optical waveguide
  that is connected to the rear stage second optical waveguide, and
  that is the first optical waveguide; and
an output unit
  that is connected to the rear stage inbound side first optical waveguide, and
  that outputs the light received from the rear stage inbound side first optical waveguide, wherein
a first thickness of at least a part of a first core of the first optical waveguide is made thicker than a second thickness of a second core of the second optical waveguide, the first thickness being in a vertical direction with respect to a surface of the first core and the second thickness being in a vertical direction with respect to a surface of the second core; and
a core of each of the two front stage outbound side first optical waveguides, the two front stage inbound side first optical waveguides, the two rear stage outbound side first optical waveguides, and the rear stage inbound side first optical waveguide is made thicker than a core of each of the front stage second optical waveguide, the middle stage second optical waveguide, and the rear stage second optical waveguide.

2. The optical device according to claim 1, wherein the second optical waveguide is a routed optical waveguide that includes at least one of a straight line waveguide and a bent waveguide that are formed on the thin film LN layer along a direction other than the direction that is substantially perpendicular to the Z direction.

3. The optical device according to claim 1, wherein
at least a part of the first optical waveguide is a ridge-type waveguide, and
at least a part of the second optical waveguide is a channel waveguide.

4. The optical device according to claim 1, wherein a core of a joining unit that joins the first optical waveguide and the second optical waveguide has a tapered shape that is gradually thinner from the first core of the first optical waveguide toward the second core of the second optical waveguide.

5. An optical device comprising:
an X-cut or a Y-cut thin film Lithium Niobate (LN) layer;
a first optical waveguide that is formed on the thin film LN layer along a direction that is substantially perpendicular to a Z direction of a crystal axis of the thin film LN layer;
a second optical waveguide that is routed and connected to the first optical waveguide;
  an input unit that inputs light;
  a branching unit that branches the light received from the input unit;
  two outbound side first optical waveguides that are branched off at the branching unit and that are the first optical waveguide;
  the second optical waveguide that is connected to each of the two outbound side first optical waveguides;
two inbound side first optical waveguides that are connected to the second optical waveguide and that are the first optical waveguide;
an electrode that applies an electrical signal to the two outbound side first optical waveguides and the two inbound side first optical waveguides;
a multiplexing unit that multiplexes the modulated light passing through the two inbound side first optical waveguides; and
an output unit that outputs the modulated light that has been multiplexed at the multiplexing unit, wherein
a first thickness of at least a part of a first core of the first optical waveguide is made thicker than a second thickness of a second core of the second optical waveguide, the first thickness being in a vertical direction with respect to a surface of the first core and the second thickness being in a vertical direction with respect to a surface of the second core; and
a thickness of a core of each of the two outbound side first optical waveguides and the two inbound side first optical waveguide is made thicker than the second thickness of the second core of the second optical waveguide.

6. An optical device comprising:
an X-cut or a Y-cut thin film Lithium Niobate (LN) layer;
a first optical waveguide that is formed on the thin film LN layer along a direction that is substantially perpendicular to a Z direction of a crystal axis of the thin film LN layer;
a second optical waveguide that is routed and connected to the first optical waveguide;
an input unit that inputs light;
a branching unit that branches the light received from the input unit;
two outbound side first optical waveguides that are branched off at the branching unit and that are the first optical waveguide;
a first electrode that applies a first electrical signal to the two outbound side first optical waveguides;
the second optical waveguide that is connected to each of the two outbound side first optical waveguides, and through which the light that has been modulated in the two outbound side first optical waveguides in accordance with the first electrical signal passes;
two inbound side first optical waveguides that are connected to the second optical waveguide and that are the first optical waveguide;
a second electrode that applies a second electrical signal to the two inbound side first optical waveguides;
a multiplexing unit that is connected to the two inbound side first optical waveguides, and that multiplexes the passing modulated light that has been modulated in the two inbound side first optical waveguides in accordance with the second electrical signal; and
an output unit that outputs the modulated light that has been multiplexed at the multiplexing unit, wherein
a first thickness of at least a part of a first core of the first optical waveguide is made thicker than a second thickness of a second core of the second optical waveguide, the first thickness being in a vertical direction with respect to a surface of the first core and the second thickness being in a vertical direction with respect to a surface of the second core; and
a thickness of a core of each of the two outbound side first optical waveguides and the two inbound side first optical waveguides is made thicker than the second thickness of the second core of the second optical waveguide.

\* \* \* \* \*